(12) United States Patent
Brendler et al.

(10) Patent No.: US 12,458,581 B2
(45) Date of Patent: Nov. 4, 2025

(54) CARBOXYLIC ACID LOADED SALT CARRIER AND THE METHOD FOR PRODUCING THEREOF

(71) Applicants: Lucas Brendler, Leipzig (DE); Andre Brendler, Leipzig (DE)

(72) Inventors: Lucas Brendler, Leipzig (DE); Andre Brendler, Leipzig (DE)

( * ) Notice: Subject to any disclaimer, the term of this patent is extended or adjusted under 35 U.S.C. 154(b) by 0 days.

(21) Appl. No.: 18/567,702

(22) PCT Filed: Jun. 10, 2022

(86) PCT No.: PCT/EP2022/065833
§ 371 (c)(1),
(2) Date: Dec. 6, 2023

(87) PCT Pub. No.: WO2022/258807
PCT Pub. Date: Dec. 15, 2022

(65) Prior Publication Data
US 2024/0277596 A1    Aug. 22, 2024

(30) Foreign Application Priority Data

Jun. 10, 2021 (LU) .................................. LU500270

(51) Int. Cl.
| | |
|---|---|
| *A61K 47/22* | (2006.01) |
| *A21D 2/14* | (2006.01) |
| *A21D 15/00* | (2006.01) |
| *A23B 2/754* | (2025.01) |
| *A23B 4/20* | (2006.01) |
| *A23K 20/105* | (2016.01) |
| *A23K 30/15* | (2016.01) |
| *A23L 5/41* | (2016.01) |
| *A61K 8/02* | (2006.01) |
| *A61K 8/67* | (2006.01) |
| *A61K 9/16* | (2006.01) |
| *A61Q 19/00* | (2006.01) |

(52) U.S. Cl.
CPC .............. *A61K 8/676* (2013.01); *A21D 2/145* (2013.01); *A21D 15/00* (2013.01); *A23B 2/754* (2025.01); *A23B 4/20* (2013.01); *A23K 20/105* (2016.05); *A23K 30/15* (2016.05); *A23L 5/41* (2016.08); *A61K 8/0225* (2013.01); *A61K 9/1617* (2013.01); *A61K 47/22* (2013.01); *A61Q 19/00* (2013.01); *A61K 2800/10* (2013.01); *A61K 2800/524* (2013.01)

(58) Field of Classification Search
None
See application file for complete search history.

(56) References Cited

U.S. PATENT DOCUMENTS

| | | | |
|---|---|---|---|
| 3,534,095 A | 10/1970 | Fingas | |
| 2002/0068113 A1 | 6/2002 | Raczek et al. | |

FOREIGN PATENT DOCUMENTS

| | | | | |
|---|---|---|---|---|
| CN | 103833545 | * | 6/2012 | ........... C07C 51/412 |
| CN | 104725215 | | 6/2015 | |
| DE | 414171 | * | 2/2025 | |
| WO | 91/19692 | | 12/1991 | |
| WO | 99/12432 | | 3/1999 | |

OTHER PUBLICATIONS

Von Wulfing (De 414171; wherein a machine translation is provided) (Year: 1925).*
Sakata et al (Characterization of dehydration and hydration behavior of calcium lactate pentahydrate and its anhydrate. Colloids and Surfaces B: Biointerfaces 46 (2005) 135-141). (Year: 2005).*
Tianjin (CN103833545 machine translation) (Year: 2012).*
Liu et al (Hydrates of calcium citrate and their interconversion in relation to calcium bioaccessibility. Food Research International 140 (2021) 109867) (Year: 2021).*
France et al (Physical and colloidal stability of conventional and micronised calcium citrate ingredient powders in the formulation of infant nutritional products. Colloids and Surfaces B: Biointerfaces 194 (2020) 111125) (Year: 2020).*
International Search Report dated Sep. 9, 2022, in PCT/EP2022/065833, 4 pages.
Written Opinion dated Sep. 9, 2022, in PCT/EP2022/065833, 6 pages.
International Preliminary Report on Patentability dated Aug. 28, 2023, in European Application No. PCT/EP2022/065833, 8 pages.

* cited by examiner

*Primary Examiner* — Jake M Vu
(74) *Attorney, Agent, or Firm* — Hemisphere Law, PLLC; Zhigang Ma

(57) ABSTRACT

A solid compound prepared as a powder that exhibits good flowability and having a specific structure is provided. The solid compound contains a carrier carboxylic acid salt and a loaded carboxylic acid, wherein the pKa of the corresponding carboxylic acid of the carrier carboxylic acid is lower than or equal to the pKa of the loaded carboxylic. The loaded carboxylic acid is physisorbed within the structure of the carrier carboxylic acid salt, and wherein the water content of the solid compound is less than 2 equivalents of water relative to the carrier carboxylic acid. Processes and pharmaceutical compositions containing the solid compound are also provided.

12 Claims, 10 Drawing Sheets

(A)

(B)

(C)

(A)

(B)

(A)

(B)

(A)

(B)

CARBOXYLIC ACID LOADED SALT CARRIER AND THE METHOD FOR PRODUCING THEREOF

CROSS-REFERENCE TO RELATED APPLICATIONS

Figure 1:
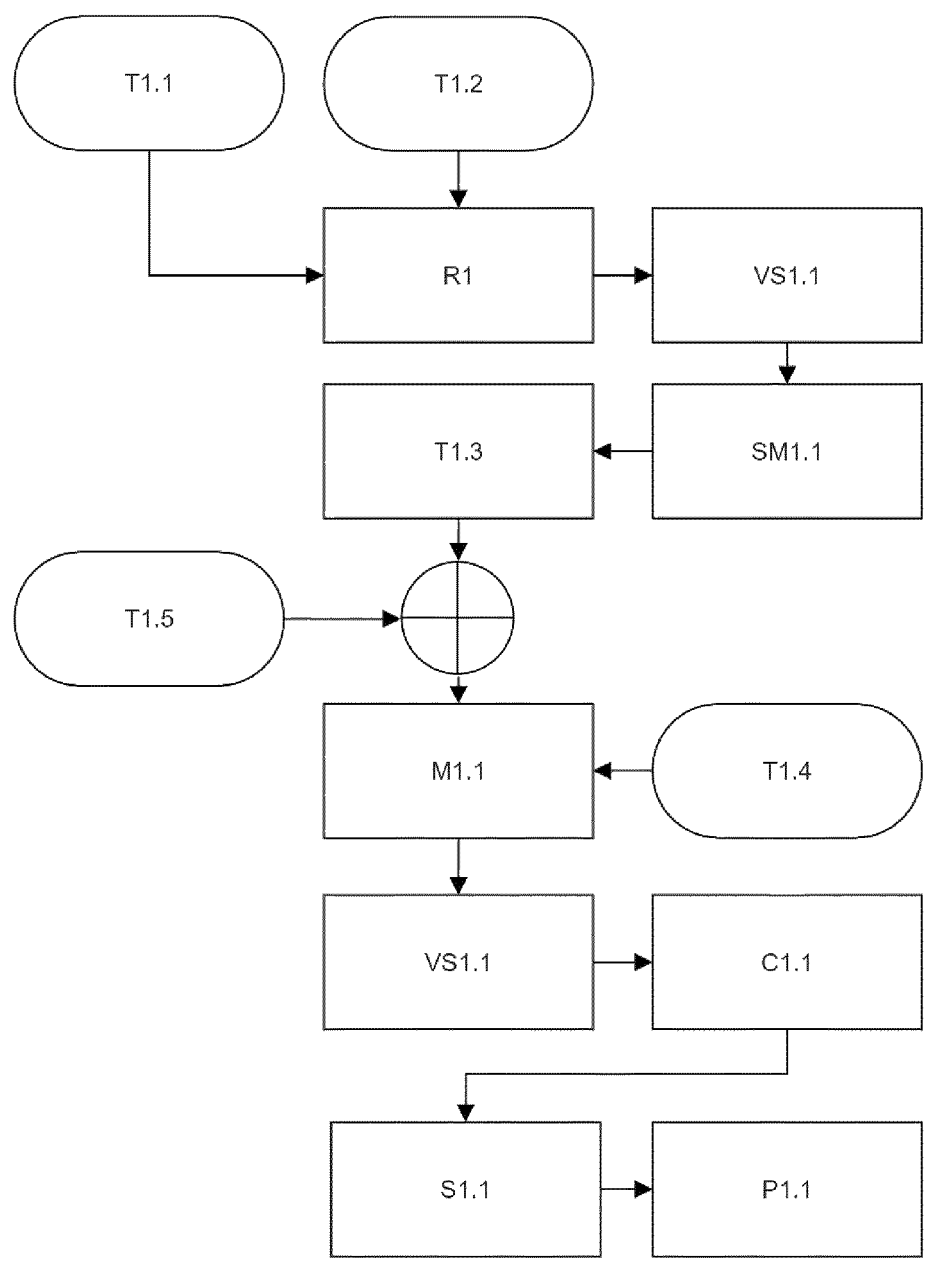

This application is a National Stage entry under § 371 of International Application No. PCT/EP2022/065833, filed on Jun. 10, 2022, and which claims the benefit of priority to Luxembourg Patent Application No. LU500270, filed on Jun. 10, 2021. The content of each of these applications is hereby incorporated by reference in its entirety.

TECHNICAL FIELD OF THE INVENTION

The present invention relates to an organic acid loaded solid compound, more particularly to a carboxylic acid loaded carboxylic acid salt carrier with free-flowing, homogenous, particulate features exhibiting controlled acid release and discloses the manufacturing process thereof.

State of the Art/Background Organic acids are used in a variety of applications due to their organoleptic, physiological, and chemical properties. Organic acids are carbon-containing chemical compounds, comprising molecules or ions with a functional group that can donate a proton, also known as a hydrogen ion $H^+$, in an equilibrium reaction with bases or acceptors of such protons, such as water. In the case of water as a proton acceptor, the oxonium ion $H_3O^+$ is formed which makes a solution acidic. Acidity is a key factor in a wide array of applications such as for buffering of (bio)chemical assays, for preservation, for cosmetic formulations, for antimicrobial formulations, as excipients in pharmaceutical applications and hence is an essential factor in many producing industries. The tendency to donate a proton is measured by the acid constant (or the $pK_a$ value) of a substance, indicating the acid strength of a molecule. It implies that the acidity increases with decreasing $pK_a$. Components capable of donating more than one proton are described by serval $pK_{ax}$, whereby each $pK_{ax}$ describes the distinct acid-base reaction of the x proton.

Most organic acids donate a proton via their carboxyl group (—COOH) and in this case are defined as carboxylic acids. As basic chemicals for technical compounds in food, personal care products, plastics, surfactants and detergents, complexing agents, colorants, and numerous other consumer and industrial goods, carboxylic acids are of great economic importance for global large-scale production. In times of globalized production, an efficient economy of basic chemicals like organic acids is a prerequisite for downstream processes of global developments, and an economical, safe, and uncomplicated transport of effective, cheap, and easily dosable compounds of organic acids is of fundamental importance for the modern industry.

Within the pharmaceutical, cosmetic, food, and feed industries, short-chain carboxylic acids with carbon chain length less than five carbon atoms are used as acidifiers, flavoring compounds, pH buffering agents and as agents to control microbial growth, whilst liquid carboxylic acids such as acetic acid are used in an array of pharmaceutical applications such as kidney dialysates. Short-chain liquid carboxylic acids used in these fields are typically formic-, acetic-, glycolic-, propionic-, lactic- and butyric acids. These substances are useful and generally non-harmful in the final products at low concentrations of typically 2 to 10% or lower by weight, as discussed by Stratford (2003), Kornhauser et al. (2010) and evidenced by numerous scientific essays. However, these substances are corrosive, flammable, volatile and classified as dangerous goods in their concentrated form. Therefore, these substances are subject to dangerous good regulations by the European Commission (2008), making their transport and storage expensive, as further demonstrated by Rytkönen (2006). These acids are therefore difficult to handle in a safe manner in the pharmaceutical, cosmetic, food or feed industry and may pose an environmental threat amongst others.

Herein WO 91/19692 discloses a solid metastable complex of calcium, citrate and malate comprising high bioavailability. However, the disclosed complex requires that the acid anions citrate and malate are present in the complex in their deprotonated form (as carboxylates). Thus, WO 91/19692 does not disclose substances that bind acids in their protonated form. To stabilize this complex, it is necessary to ensure that a supernatant of calcium within the complex is present when dried, as lower ratio salts could drop out of solution. In addition, metastable complexes are disadvantageous because very large amounts of the complex are needed to achieve the desired effect.

U.S. Pat. No. 3,534,095 discloses the dihydrate fumaric acid salts with magnesium or calcium as well as a process for the preparation thereof. Herein, the fumaric acid and magnesium or calcium are in a fixed chemical 1:1 stoichiometric ratio. Similarly, US 2002/0068113 discloses calcium double salts of formula $Ca(R^1)(R^2)$ containing two different acid units per double salt molecule, wherein $R^1$ and $R^2$ are saturated or mono- or polyunsaturated $C_1$-$C_5$-alkyl acids, that can for example be used in foods, animal feed, pet food, cosmetic and pharmaceutical agents. However, the fixed stochiometric relation between the bivalent magnesium or calcium cation salt and the short-chain carboxylic acid is a shortcoming, as very high amounts of the (double) salt are needed to achieve the desired preservative effect and a minimum pH below a cut-off point, especially the $pK_a$ value of the corresponding acid(s), is required to ensure sufficient and effective antimicrobial functionality.

To mitigate high transport costs or reduce the dangerous features, these liquid short chain carboxylic acids are frequently (partially) neutralized and/or diluted. The lower concentration of active substance upon dilution/neutralization of such liquid acids results in a reduced application efficacy, for example with respect to their antimicrobial and acidifying properties.

A specific example for such a use within the food industry is described in Patent US 2008/0317921 A1 by the control of *Listeria Monocytogenes, E. Coli* and other pathogens in meat products using an aqueous sodium lactate solution blended with vinegar, acetic acid, or an acid salt thereof. The attempt to compensate the dilution of organic acids by using a higher amount of the diluted compound leads to efficacy limitations of the substance compound and high transport costs, rendering the application of short-chain carboxylic acids in the various industries impractical and uneconomical. Moreover, even diluted forms of acids are subject to varying degrees of provisions of dangerous good transportation legislation. Similar handling challenges can be observed for formic-, acetic-, propionic-, lactic-, glycolic-, and butyric acid applied as buffering agents, fragrances, humectants, antimicrobials, preservatives, pH adjusters and skin conditioning agents in cosmetic as well as in dermatological applications (see Cosmetic ingredients database CosING), making these challenges an essential limitation for a broad field of industries. Similarly, other organic acids such as salicylic acid or benzoic acid are also used in the cosmetic and pharmaceutical industry due to their antifungal and preservative function with salicylic acid being used due to its keratolytic properties. Such substances display the same general acid handling problems, rendering the manufacturing process less efficient and thus more costly.

One common approach to improve the handling of carboxylic acids is adsorbing the previously mentioned acids into high-surface mineral carrier systems. WO 97/07687 discloses granules consisting of a core material of a porous carrier and an organic acid, and a swellable coating material. Similar high-surface mineral carrier systems comprise mineral silicates such as precipitated silica, zeolites, bentonite, vermiculite, or diatomaceous earth. Mixing carboxylic acids and mineral silicates results in solid products with a carboxylic acid content of typically 30% to 70% by weight. Such products are currently used in the feed industry as so called "acidifiers" to promote animal growth and health, as described in EP 1 761 133 B1, wherein the carrier is diatomaceous earth. However, this approach is suboptimal due to the high percentage of unfunctional, inert and indigestible silicate carriers. Mineral silicates such as magnesium aluminum silicate are used in the cosmetic industry as absorbents, but their potential as acid carriers has so far not been exploited.

US 2002/0086090 discloses a solid preparation of mixed acids of sorbic acid, at least one liquid organic acid and at least one other solid organic acid, both referring to the aggregation state at room temperature (23° C.). The compound is a pure mixture of acids, i.e. no chemical reaction occurs between the acids, no carrier is formed and hence, the dangerous good regulations do not facilitate a cost-efficient transport of the acids.

A further possible industrial application of carboxylic acids is the use of acid adducts of alkali metal salts of carboxylic acids, e.g. sodium or potassium diacetate. These substances are solids with the following structure

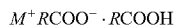

$M^+$ is a sodium ($Na^+$) or potassium ($K^+$) ion, $RCOO^-$ is a short-chain carboxylate ion such as acetate and RCOOH is the corresponding short-chain carboxylic acid such as acetic acid. The resulting solid acid acetate salt can for instance be used to impart salt and vinegar flavor to potato chips or salad dressings, as described in U.S. Pat. No. 3,672,914 A. However, adducts such as potassium or sodium diacetate have, according to the CosING Database, limited permission in cosmetic products in the EU and are not relevant for the technical challenges of a broader field of industry. Alkali metal cations, practically limited to sodium or potassium, are associated with characteristic modern diseases of civilization, such as obesity, coronary artery disease, type 2 diabetes or high blood pressure, as investigated by Grillo et al. (1970), whereas an excess of potassium acts as a laxative on the human and animal digestive tract and may contribute to hyperkalemia, as evidenced by Mandal (1997). Furthermore, the fixed stochiometric relation between the monovalent alkali metal cation salt and the short-chain carboxylic acid is a shortcoming. With this regard it is highly desirable to provide the benefits of organic acids, especially short-chain carboxylic acids, in an inclusion of alternative bioavailable metal salts, which preferably support human and animal health as essential agents in biochemical pathways as magnesium is e.g. important for muscular contraction, blood coagulation or vitamin resorption and calcium is an important building block of bones and teeth. To date, a disadvantage addressing the handling and transport shortcomings of liquid carboxylic acids is posed by their high dosing requirements and their limited feasibility due to the high costs of the compounds.

WO 99/12432 discloses soaked salts, containing at least one salt of one or several organic carboxylic acids in liquid form in which 0.5 to 30 wt. % of at least one liquid organic carboxylic acid has been incorporated in relation to the carboxylic acid salt. However, this corresponds to a salt in which the amount of incorporated acid is merely below a stoichiometric ratio of 1. Furthermore, as stated by the WO 91/19692 (see above) such soaked salts comprising carboxylic acids in liquid form tends to drop out of solution. For this reason, these soaked salts are not stable over the long term, as there is a risk that the composition will change over time during storage.

DE 414171 discloses an acidic calcium lactate salt comprising the composition of $(C_3H_5O_3)_2Ca + 2\ C_3H_6O_3 + 2H_2O$. However, this salt comprises a high amount of water of at least 8.3%, which significantly increases storage and transport requirements and furthermore renders the determination of the correct proportion of acid to be added within an application thereof more difficult.

OBJECT OF THE INVENTION

Technical Problem

There is an urgent requirement to overcome the shortcomings of the above-mentioned existing compounds of organic acids and provide a safely processable, free-flowing powdered compound, capable of carrying and releasing the liquid carboxylic acids in a controlled manner, without the use of mineral carriers and without the necessity of incorporating sodium or potassium ions in the compound whilst being customizable in terms of loaded acid type and content.

Moreover, a process for manufacturing the described carboxylic acid loaded salt carrier should be facile, should provide high loading capacity of loaded acids, should be based on cheap starting materials and should be without the need for additives or catalysts, and therefore facilitate an economic synthesis on an industrial scale.

Solution to Problem

According to the invention, this objective is achieved by a short-chain carboxylic acid, most preferably a $C_1$-$C_4$-carboxylic acid, loaded within a carboxylic acid salt carrier according to claim 1, and the method for the production thereof. Further advantageous refinements of the invention are specified in the dependent claims.

Thus, the present invention provides a solid compound prepared as a powder that exhibits good flowability comprising the following structure,

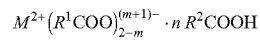

or

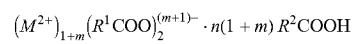

preferably prepared by a facile process of preparation described herein containing the following components
a carrier carboxylic acid salt $M^{2+}(R^1COO)_{2-m}^{(m+1)-}$, more preferred

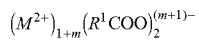

in which

M$^{2+}$ is an alkaline earth metal ion, preferably calcium (Ca), magnesium (Mg), barium (Ba) or a divalent metal ion selected from iron (Fe), copper (Cu), zinc (Zn), manganese (Mn), tin (Sn) or a mixture of thereof, R$^1$ is an optionally substituted C$_1$-C$_{10}$-alkyl group, an optionally substituted mono- or polyunsaturated C$_1$-C$_{10}$-alkyl group or an optionally substituted aryl group, wherein the substituents are independently selected from carbonyl group (=O), preferably comprising a carbonyl next to a hydroxy group by forming a carboxylic acid group, preferably a deprotonated carboxylic acid group, amino group (NH$_2$), hydroxy group (OH), halogen, cyano group (CN) or a mixture thereof, and wherein m is 0 to 2, a loaded carboxylic acid R$^2$COOH, wherein R$^2$ is an optionally substituted C$_1$-C$_{10}$-alkyl group or an optionally substituted mono- or polyunsaturated C$_1$-C$_{10}$-alkyl group, wherein the substituents are independently selected from carbonyl group (=O), preferably comprising a carbonyl next to a hydroxy group by forming a carboxylic acid group, preferably a protonated carboxylic acid group, amino group (NH$_2$), hydroxy group (OH), halogen or cyano group (CN) or a mixture thereof, wherein 1<n≤6;

wherein the pK$_{a1}$ of the corresponding carboxylic acid of the carrier carboxylic acid (R$^1$COO)$_{2-m}$$^{(m+1)-}$≤pK$_{a1}$ or (R$^1$COO)$^{(m+1)-}$≤pK$_{a1}$ of the loaded carboxylic acid(s) R$^2$COOH, wherein the loaded carboxylic acid(s) R$^2$COOH, preferably the protonated loaded carboxylic acid(s) is physisorbed within the structure of the carrier carboxylic acid salt M$^{2+}$(R$^1$COO)$_{2-m}$$^{(m+1)-}$ or (M$^{2+}$)$_{1+m}$(R$^1$COO)$_2$$^{(m+1)-}$.

Herein, the invention concerns carboxylic acid loaded salt carriers and their synthesis, which yield dry powder carrier salts espousing essential benefits with regards to dosability and processability, such as good flowability and high acid efficacy through high molar concentrations without limitations imposed by dangerous good regulations. These acidic, solid, and free-flowing compounds can be used in pharmaceutical, cosmetic, food, and feed applications.

A novel approach for manufacturing short-chain carboxylic acids, preferably C$_1$-C$_4$-carboxylic acids, by physisorption thereof within a salt carrier as described herein and in the claims has been found. The process comprises the reaction of a carrier acid and a source of an alkaline earth metal ion, preferably as a base, with the loading acid(s) present in the reaction mix and is synoptically conducted by mixing the starting materials under thermal control with subsequent drying of the size-defined powder from the condensate side product. Exploiting the acidic strength of the starting materials, a physisorbed acid inclusion component of a carboxylic acid loaded salt carrier is obtained from this process in good yields, providing an acidic-functional powder that exhibits good flowability.

Advantageous Effects of Invention

Advantages and Description of the Products
Inclusion/Physisorption

The inventive compound is related to a series of carboxylic acid loaded carboxylic acid salt carriers, in short acid loaded carrier, which possess controlled acidity and appear in powder form, containing carboxylic liquid short-chain acids. As used herein, the term powder refers to a particulate material which is in a solid or semisolid state when placed in an open container at atmospheric pressure and room temperature (r.t., 23° C.).

An inclusion compound, such as the carboxylic acid loaded carboxylic acid salt carrier of this invention, is a compound in which one chemical component, the carrier, has the capacity to entrap other components. The inclusion of reactive components such as short-chain carboxylic acids has essential benefits as the loaded components, preferably the loaded carboxylic acid(s) are physisorbed, which is an interaction without covalent bonding, in the matrix/cavity of the carrier material, whence their reactivity is mediated in the inclusion. The mediated reactivity of the carrier loaded reactants facilitates a control of their acidity, which is essential for the industrial exploitation of reaction pathways. Amongst other, the mediated reactivity of an inclusion compound beneficially facilitates security/stability for storage or during transport in technical chemistry.

The strength of the physisorption is a major indicator for the stability of an inclusion compound according to the invention and can be semi-quantitatively analyzed via thermal analysis. Thermal analysis is the analysis of a change in a property related to an imposed change in the temperature. Thermogravimetric analysis (TGA) is the most widely used thermal analysis method and measures weight changes in a material as a function of temperature (or time) and hence suitable to evaluate the quality of the compound of invention by analysis of the physicochemical transformations highly relevant for the stability of an inclusion formulation, such as desorption processes, decomposition and/or dehydration. The compounds of invention beneficially show a controlled desorption of the loaded acids, which can be independently induced from the likewise thermally induced purification of the compound of invention. Furthermore, the thermally induced desorption of the loaded carboxylic acids from the compound of invention showed to be quantitative in a distinct temperature range, whilst the carrier component is beneficially stable up to 300° C.

Differential thermal analysis (DTA), where the temperature of a sample is compared with that of an inert reference material during a programmed change of temperature, validated the control of the highly relevant endothermic processes for the compound of invention, like evaporation of water as a purification of the compound of invention and/or desorption, which is the release of the active compound. Therefore, the investigation of the changes of weight (TGA signal) and the simultaneous detection of the caloric phenomena (DTA signal), are a proof of concept for the successful acid release for the compound of invention.

It has been shown that the desorption of the loaded acids of the inventions compounds requires a significant energetic stimulation for the release of loaded acid(s) from the acid loaded carrier, e.g. via thermal energy entry, when compared to the isolated acid alone. The additional energy required to release the loaded carboxylic acid from the carrier structure clearly demonstrates the stability of the compound of invention, which is based on the strength of the physisorption of the loaded carboxylic acid at the carrier structure. Hence, the substance is an inclusion compound.

Therefore, the beneficially retarded evaporation or the increased thermal energy required to release the loaded carboxylic acid from the carrier structure, evidences the stability of the compound of invention. The retarded release of carboxylic liquid short-chain acids by evaporation if loaded according to the invention, effectively suppresses the uncontrolled release of the loaded short-chain acid via evaporation, making ornate cooling of the formulation below room temperature or extensive sealing of the container employed for the storage of the compound of invention unnecessary.

Organic Acids and pKa (General Overview)

Organic acids are carbon-containing chemical compounds, which acidity is exploited for a wide array of applications and important for a broad field of producing industries. The compound according to the invention embodies a loaded carboxylic acid in a dry state thus beneficially facilitating the control of its acidic reactivity. Since this invention is primarily concerned with the acidity residing in the first equilibrium of proton dissociation from a carboxyl group (—COOH), the $pK_{a1}$ values are most relevant.

Strong acid-base reactions, e.g. those of carrier carboxylic acids, are typically exothermic. According to the invention, the $pK_{a1}$ of the corresponding acid of the carrier $(R^1COO)^{(m+1)-}$ or $(R^1COO)_{2-m}^{(m+1)-}$ of the metal counterion is equal or lower than the $pK_{a1}$ of the loaded carboxylic acid $R^2COOH$ or of any $R^2COOH$ of a mixture thereof. Herein, the $pK_a$ difference of the components of invention is technically exploited as the thriving reaction force to generate the inclusion compound. On this pathway there is no need to support intended reaction pathways for the generation of the compound of invention, e.g. by the use of further additives, reactants or catalysts. As no further additives, reactants or catalysts are needed, the desired products possess a higher purity, and a purification is significantly eased. Furthermore, the characteristic properties of the obtained solid products are not contaminated by residual additives required elsewhere.

Carrier Carboxylic Acid

The solid compound according to the invention comprises a carrier carboxylic acid salt $(R^1COO)^{(m+1)-}$ or $(R^1COO)_{2-m}^{(m+1)-}$, referred to as carrier acid, forming the acid salt carrier upon reaction with the alkaline earth metal base. According to the invention, the carrier acid possesses a lower $pK_a$ or a stronger acidity respective the acids to be loaded within the carrier, which beneficially facilitates the in-situ generation by the neutralization of the carrier acid to its corresponding salt, forming the carrier structure. Hence a carrier acid does not possess activity after the generation of the inclusion compound of invention, serving as a stable carrier for the loaded acid. Thus, the term "carrier carboxylic acid" herein corresponds to the partially deprotonated or completely deprotonated form of the corresponding carboxylic acid (also called carboxylate) and comprises—dependent on the pH value during the process for preparing of the solid compound—at least one deprotonated carboxylic acid group (—COO$^-$), more preferably all carboxylic acid group(s) of the carrier carboxylic acid in the carrier carboxylic acid salt are deprotonated. Preferably, the deprotonated carboxylic acid group is in association with the divalent metal ion ($M^{2+}$) forming the carrier carboxylic acid salt, more preferably forming a complex structure.

According to the invention, the $pK_{a1}$ of the corresponding acid of the carrier $(R^1COO)^{(m+1)-}$ or $(R^1COO)_{2-m}^{(m+1)-}$ of the metal counterion is equal or lower than the $pK_{a1}$ of the loaded carboxylic acid $R^2COOH$ or of any $R^2COOH$ of a mixture thereof. According to a preferred embodiment of the invention, the difference of the $pK_{a1}$ ($\Delta pK_{a1}$) between the carrier carboxylic acid $(R^1COO)^{(m+1)-}$ or $(R^1COO)_{2-m}^{(m+1)-}$ and the corresponding loaded carboxylic acid(s) $R^2COOH$ is $0.1 \leq \Delta pK_{a1} \leq 5.0$, preferably $0.2 \leq \Delta pK_{a1} \leq 4.0$, more preferably $0.3 \leq \Delta pK_{a1} \leq 3.0$. The therein defined difference between the $pK_{a1}$ of the corresponding acid of the carrier carboxylic acid salt $(R^1COO)^{(m+1)-}$ or $(R^1COO)_{2-m}^{(m+1)-}$ and that of the loaded carboxylic acid(s) $R^2COOH$ beneficially increases the stability of the compound of invention. This increased stability is of great benefit regarding transport and storage of the compound of invention. Furthermore, the preferred $pK_a$ difference of the acid-base reactive components of invention enables beneficially an increased selectivity of the intended reaction pathways, suppressing side-reactions.

The carrier carboxylic acid $(R^1COO)^{(m+1)-}$ or $(R^1COO)_{2-m}^{(m+1)-}$ according to the invention discloses $R^1$, which is selected from an optionally substituted $C_1$-$C_{10}$-alkyl group, an optionally substituted mono- or polyunsaturated $C_1$-$C_{10}$-alkyl group or an optionally substituted aryl group wherein the substituent is selected from a carbonyl group (=O), preferably comprising a carbonyl next to a hydroxy group by forming a carboxylic acid group, amino group (NH$_2$), hydroxy group (OH), halogen or cyano group.

According to the invention, $R^1$ is described by the formula —X, —C$^\beta$X$_3$ or —C$^\beta$X$_2$R$^3$ or —C$^\beta$XR$_2^3$ or —C$^\beta$R$_3^3$, where C is the ß-carbon atom with regards to the carboxyl group $(R^1COO)_{2-m}^{(m+1)-}$ of the carrier. Preferably $R^1$ is selected from the formula —X, —C$^\beta$X$_3$ or —C$^\beta$X$_2$R$^3$. More preferable according to the invention is the selection of the formula —X or —C$^\beta$X$_2$R$^3$ for $R^1$. The therein more preferred groups chosen for $R^1$ therefore beneficially constitute carrier carboxylic acids of increased acidity due to a decreased resonance stabilization for the deprotonated carrier carboxylic acid form. Hence a high yielding and fast acid-base reactivity of the carrier carboxylic acid is achieved, whilst generating the corresponding carrier carboxylic salt or the carrier component respectively upon neutralization. The increased acidity kinetically mitigates side reactions and makes a stimulation of the desired reaction pathways, e.g. due to further additives, reactants or catalysts, beneficially unnecessary.

$R^3$ according to the invention may comprise groups of an optionally substituted $C_1$-$C_{10}$-alkyl group, or an optionally substituted aryl group. Preferably $R^3$ is chosen from a group consisting of an optionally substituted $C_1$-$C_8$-alkyl group, an optionally substituted mono- or polyunsaturated $C_1$-$C_8$-alkyl group or an optionally substituted aryl group. More preferably $R^3$ is chosen from a group consisting of an optionally substituted $C_1$-$C_6$-alkyl group, an optionally substituted mono- or polyunsaturated $C_1$-$C_6$-alkyl group or an optionally substituted aryl group. A beneficial technical effect stems from the decreased alkyl chain length of $R^3$ as precedingly defined, as these structures possess increased solubility in polar solvents. A good solubility in polar solvents, e.g. water, is highly relevant for any technical reaction pathway and manufacturing process and profitable for the application of carrier carboxylic acid salts in the industry.

The substituent of $R^3$ according to the invention may comprise an amide group, ester group, ether group, thioether group, carbonyl group (=O), preferably comprising a carbonyl next to a hydroxy group by forming a carboxylic acid group (—COOH), amino group (—NH$_2$), hydroxy group (—OH) or X, wherein X is selected from fluorine (—F), chlorine (—Cl), bromine (—Br). The substituent of $R^3$ is preferably selected from a carbonyl group (=O), preferably comprising a carbonyl next to a hydroxy group by forming a carboxylic acid group, amino group (—NH$_2$) or hydroxy group (—OH). The substituent of $R^3$ is more preferably chosen from a carbonyl group (=O), comprising a carbonyl next to a hydroxy group by forming a carboxylic acid group, amino group (—NH$_2$) or hydroxy group (—OH).

The substituents X may be selected from hydrogen (H), hydroxy (OH) group, fluorine (F), chlorine (Cl), bromine (Br), or another electron withdrawing functional group like cyano (CN) group. Preferred substituents for X are chosen from hydrogen (H), hydroxy (OH) group, fluorine (F), chlorine (Cl), or another electron withdrawing functional group like the cyano (CN). More preferably according to the invention, hydrogen (H) or hydroxy (OH) group is selected for X. The substituents for X selected herein include structures which are rather inexpensive to synthesize and/or naturally abundant and have the most technical significance.

An example for the more preferred carrier carboxylic acid components of the invention is given by $R^1$ selected by —X and a hydrogen (H) selected for —X, constating formic acid. Further examples of more preferred carrier carboxylic acid are given if —C$^\beta$R$^3$X$_2$ is selected for $R^1$ and X is chosen from a hydrogen (H) or a hydroxy (OH) group, constituting more preferred secondary $C^\beta$ atoms. The herein defined formula comprises more preferred carrier acids (herein defined as partially deprotonated or completely deprotonated form of the corresponding carboxylic acid) of the invention with high relevance for industrial products like acetic acid (HAc), propionic acid (HProp), lactic acid (HLac), glycolic acid (HGly), butyric acid (HBu), succinic acid (HSuc), fumaric (HFum) or maleic acid, adipic acid (HAd), malic acid (HMa), malonic acid (HMal), tartaric acid (HT), aspartic acid (HAsp), glutamic acid (HGlu), benzoic acid (HBen), salicylic acid (HSal), citric acid (HCit), ascorbic acid (HAsc) and formic acid (HFo).

According to a preferred embodiment, the carrier carboxylic acid is selected from the group consisting of acetic acid (HAc), propionic acid (HProp), lactic acid (HLac), glycolic acid (HGly), butyric acid (HBu), succinic acid (HSuc), fumaric (HFum) or maleic acid, adipic acid (HAd), malic acid (HMa), malonic acid (HMal), tartaric acid (HT), aspartic acid (HAsp), glutamic acid (HGlu), benzoic acid (HBen), salicylic acid (HSal), citric acid (HCit), ascorbic acid (HAsc) and formic acid (HFo) or a mixture thereof to form the corresponding carrier carboxylic acid salt $(M^{2+})_{1+m}(R^1COO)_2^{(m+1)-}$.

In case, the carrier carboxylic acid salt comprises a mixture of two or more carrier carboxylic acids per molecule of a carrier carboxylic acid salt, the carrier carboxylic acid salt forms a so called "double salt". Thus, the solid compound according to the invention is a double salt of a carrier carboxylic acid salt in combination with one or more loaded acid(s) as defined herein.

The following figure shows the general formula of the carrier carboxylic acid salt $(R^1COO)^{(m+1)-}$ or $(R^1COO)_{2-m}^{(m+1)-}$ (figure below, full box), the formula of the most preferred carrier carboxylic acid defined by the selection of the formula —X or —C$^\beta$X$_2$R$^3$ for $R^1$, and examples of the latter (figure below, right).

The coefficient m defines the number of negative charges of $R^1$ of the acid of the carrier acid ($R^1$COOH). Preferably, the negative charge within $R^1$ is 0, 1 or 2, so m is 0 to 2.

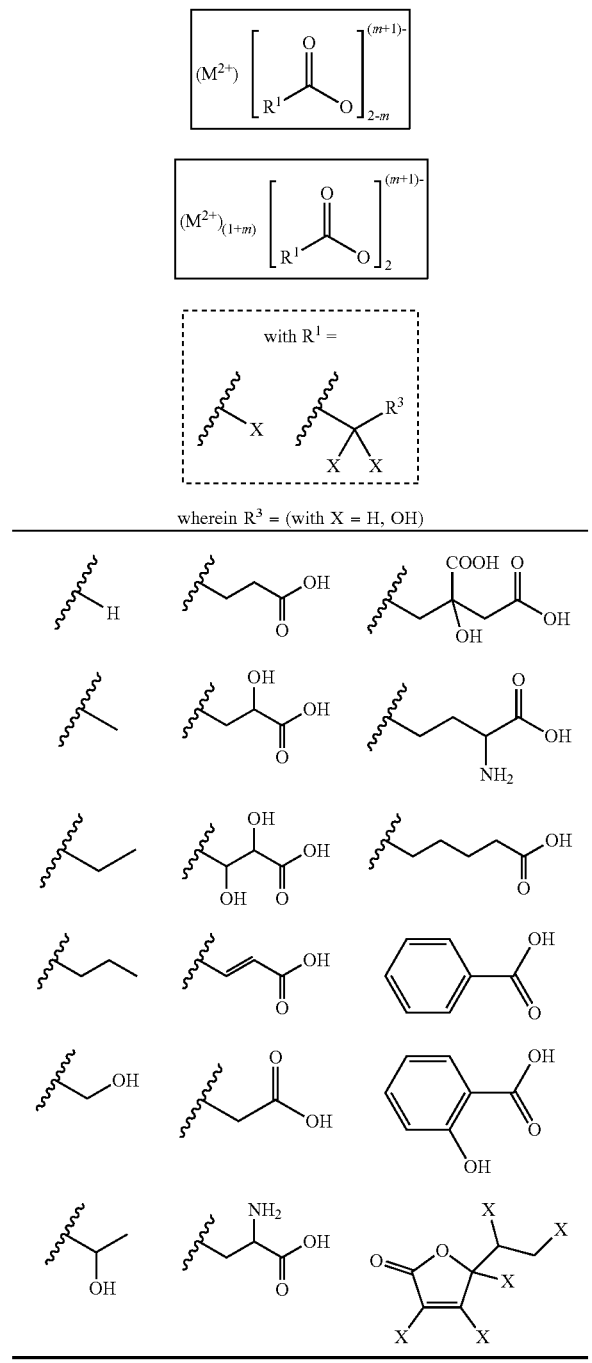

As the carrier carboxylic acid must possess a lower pKa than the loaded carboxylic acid(s), most preferably comprised by formic acid, acetic acid, propionic acid, lactic acid, glycolic acid, and butyric acid, a broad choice of pairing carrier-acid is beneficially given, providing advantageously a versatile platform of carboxylic acid loaded carboxylic acid salt carrier.

Carrier carboxylic acids according to the invention may comprise carboxylic acids solid at room temperature selected from arachidic acid, stearic acid, palmitic acid, myristic acid, enanthic acid, caprylic acid, oxalic acid, aspartic acid, glutamic acid, malonic acid, tartaric acid, salicylic acid, fumaric or maleic acid, citric acid, malic acid, ascorbic acid, succinic acid, benzoic acid, adipic acid, formic acid, glycolic acid, lactic acid, acetic acid, butyric acid and propionic acid. Preferred carboxylic carrier acids according to the invention are selected from enanthic acid, caprylic acid, oxalic acid, aspartic acid, glutamic acid, malonic acid, tartaric acid, salicylic acid, fumaric or maleic acid, citric acid, malic acid, ascorbic acid, succinic acid, benzoic acid, adipic acid, formic acid, glycolic acid, lactic acid, acetic acid, butyric acid and propionic acid. More preferably according to the invention, carboxylic carrier acids are selected from aspartic acid, glutamic acid, malonic acid, tartaric acid, salicylic acid, fumaric or maleic acid, citric acid, malic acid, ascorbic acid, succinic acid, benzoic acid, adipic acid, formic acid, glycolic acid, lactic acid, acetic acid, butyric acid and propionic acid, where the last six being liquid at room temperature. The therein selected carboxylic acids possess a decreased hydrophobic nature with respect to longer chain linear carboxylic acids. Therefore, the most preferably selected carboxylic carrier acids according to the invention possess solubility in polar solvents, aiding facile handling and manufacturing.

Compounds according to the invention comprising citrates have e.g. been shown to significantly improve growth performance in aquaculture fish (Reviews in Aquaculture, 2017).

Furthermore, the use of an ascorbate carrier according to the invention in combination with loaded acetic acid is for example suitable for the use as a color retention agent in food, and feed applications. The loaded acetic acid in said compounds of invention acts beneficially as an acidifier (pH Control mitigating myoglobin oxidation). A compound of invention comprising derivatives of ascorbic acid (vitamin C) beneficially provides the vital roles of ascorbic acid to act as an antioxidant, protecting cellular components from free radical damage.

The $pK_{a1}$ values of a selection of the preferred carrier carboxylic acid according to the invention are listed in the following Table 1, indicating a liquid state at room temperature by an asterisk:

TABLE 1

A selection of preferred carrier carboxylic acid according to the invention and their $pK_{a1}$ values, where a liquid state at room temperature is indicated by an asterisk (*).

| Acid | $pK_{a1}$ |
| --- | --- |
| aspartic acid | 1.99 |
| glutamic acid | 2.16 |
| malonic acid | 2.83 |
| tartaric acid | 2.98 |
| salicylic acid | 2.75 |
| fumaric acid | 3.00 |
| citric acid | 3.09 |
| malic acid | 3.40 |
| formic acid* | 3.77 |

TABLE 1-continued

A selection of preferred carrier carboxylic acid according to the invention and their $pK_{a1}$ values, where a liquid state at room temperature is indicated by an asterisk (*).

| Acid | $pK_{a1}$ |
| --- | --- |
| glycolic acid* | 3.83 |
| lactic acid* | 3.86 |
| ascorbic acid | 4.25 |
| succinic acid | 4.19 |
| benzoic acid | 4.20 |
| adipic acid | 4.43 |
| acetic acid* | 4.76 |
| butyric acid* | 4.82 |
| propionic acid* | 4.88 |

A modification of the $pK_a$ of organic acids is generally possible by the change of the alkyl chain length or functional substituents along the latter. Generally, the $pK_a$ of organic acids only decreases slightly with the alkyl chain length. A more effective modification of the $pK_a$ of organic acids is possible by suitable substituents affecting the acidity of the carboxyl group, preferably located at the $C^\beta$ atom of the latter, which is true for X.

In an embodiment of the invention, X is selected from a hydrogen (H), or an electron withdrawing group selected from fluorine (—F), chlorine (—Cl), bromine (—Br), iodine (I) or cyano (—CN). In a preferred embodiment of the invention, X is selected from a hydrogen (H), or an electron withdrawing group selected from fluorine (—F), chlorine (—Cl), bromine (—Br), or cyano (—CN). In a more preferred embodiment of the invention, X is selected from a hydrogen (H), or an electron withdrawing group selected from fluorine (—F), chlorine (—Cl), or cyano (—CN).

The X substituents at the $C^\beta$ of the carrier carboxylic acid selected in the embodiment of the invention possess a higher electron negativity (EN) than a carbon $EN_C$ and induce an inductive electron withdrawal, thus increasing the acidity of carrier carboxylic acids. Therefore, the $pK_a1$ of the preferred embodiment of the invention according to the carrier carboxylic acids is beneficially decreased, which is even more pronounced for substituents X of a higher electronegativity with respect to $EN_C$ in the order (F>Cl>Br>I) and considered in the more preferred embodiment of invention.

The increased acidic strength upon the selection of X according to the (more) preferred embodiment of the invention beneficially facilitates a broader choice of carrier acid-to loaded acid-pairs, whilst lowering the $pK_a$ of the carrier carboxylic acid with respect to the loaded carboxylic acid according to the criteria of invention. Lowering the $pK_{a1}$ by functional ß-substituents therefore opens pathways for new compounds of loading/loaded acids.

The following figure shows the general formula of the carrier carboxylic acid salt $(R^1COO)^{(m+1)-}$ or $(R^1COO)_{2-m}^{(m+1)-}$ (figure below, full box), structures of the embodiment of the carrier carboxylic acid of invention defined by $R^1$ (figure below, dotted box) and examples of the latter (figure below, to the right). The structures are shown in analogy to the examples shown for the more preferred selection in previous.

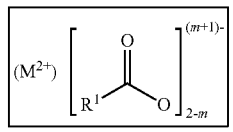

or

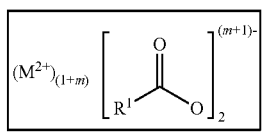

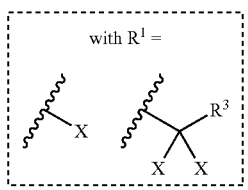

wherein $R^3$ = (with X = H, F, Cl, Br, CN)

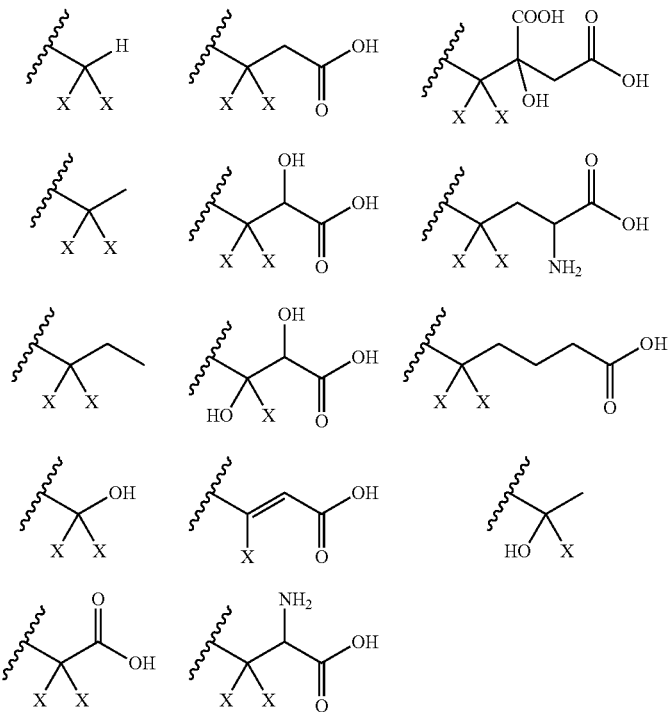

Furthermore, the modification of the acidity of the carrier carboxylic acid by purposeful choice of the substituents X reinforces the aforementioned advantages, increasing the $pK_{a1}$ difference between the carrier acid and the loaded acid. Therefore, an increased stability, an increased security of the acid loaded carboxylic acid salt carrier for transport and storage, as well as an increased selectivity and/or reaction rate of the acid-base reaction are beneficially achieved.

A further advantage is the usability of di- or tricarboxylic acids, especially completely or partially deprotonated di- or tricarboxylic acids as carrier carboxylic acid $(R^1COO)^{(m+1)-}$, wherein $R^1$ comprises at least one or two carboxylic acid groups (—COOH), preferably deprotonated carboxylic acid groups (—COO$^-$), so m is 1 or 2, which can bind to the metal ion $M^{2+}$ with multiple carboxylic groups (polydentate ligands) and/or a carrier carboxylic acid $(R^1COO)^{(m+1)-}$, wherein $R^1$ comprising at least one amino group (—NH$_2$) and/or at least one hydroxy group (—OH) both thus forming a chelation complex. The chelation effect greatly enhances the stability of the carrier salt and reduces the ligand exchange with the loaded acid. For example, the loaded carboxylic acid is oxalic acid, citric acid, itaconic acid, malic acid, maleic acid, tartaric acid, salicylic acid, glycolic acid, succinic acid, adipic acid, ascorbic acid or a mixture thereof, preferably $R^1$ of the carrier carboxylic acid comprises one or two carboxylic acid groups (—COOH), preferably deprotonated carboxylic acid groups (—COO$^-$), creating a pronounced chelation complex, wherein the carrier carboxylic acid is for example selected of oxalic acid, succinic acid, adipic acid, malic acid, maleic acid, citric acid, itaconic acid, tartaric acid or a mixture thereof.

Loaded Acids and pKa

The term "loaded carboxylic acid" herein preferably refers to the protonated form of the corresponding carboxylic acid, wherein the carboxylic acid comprises at least one protonated carboxylic acid group (—COOH), preferably all carboxylic acid groups of the (loaded) carboxylic acid are in protonated form. Advantageously, the (protonated) carboxylic acid is solid within the solid compound according to the invention, preferably through physisorption and/or cluster formation with the carrier carboxylic acid salt.

The acid-reactive component of the compound according to the invention comprises one or more loaded carboxylic acid(s) $R^2COOH$, preferably one or more protonated loaded carboxylic acid(s), referred to as the loaded acid, where $R^2$ may comprise an optionally substituted $C_1$-$C_{10}$-alkyl group, an optionally substituted mono- or polyunsaturated $C_1$-$C_{10}$-alkyl group or an optionally substituted aryl group, preferably $R^2$ is chosen from an optionally substituted $C_1$-$C_3$-alkyl group, an optionally substituted mono- or polyunsaturated $C_1$-$C_3$-alkyl group or an optionally substituted aryl group, more preferably $R^2$ is selected from an optionally substituted $C_1$-$C_4$-alkyl group, an optionally substituted mono- or polyunsaturated $C_1$-$C_4$-alkyl group or an optionally substituted aryl group. The preference for the loaded acid as short-chain carboxylic acids in this invention, most preferably a $C_1$-$C_4$ with an alkyl chain length less than five, is related to their liquid aggregation state at room temperature (r.t.). Therefore, liquid carboxylic acids such as formic acid, acetic acid, glycolic acid, propionic acid, butyric acid and lactic acid can be handled in the powder form, which is highly relevant for security purpose and makes dilution beneficially not necessary. These aspects are highly relevant for said liquid short-chain carboxylic acids in their application in pharmaceutical, cosmetics, food, and feed industries.

The substituents of $R^2$ may be selected from hydrogen (—H), carbonyl (=O) group, preferably comprising a carbonyl next to a hydroxy group by forming a carboxylic acid group, amino (—NH$_2$) group, hydroxy (—OH) group, halogen, comprising fluorine (—F), chlorine (—Cl), bromine (—Br), iodine (—I), or cyano (—CN) group or a mixture thereof. Preferred substituents of $R^2$ are chosen from hydrogen (—H), carbonyl (=O) group, preferably comprising a carbonyl next to a hydroxy group by forming a carboxylic acid group (—COOH), preferably a protonated carboxylic acid group, hydroxy (—OH) group or a mixture thereof. More preferably according to the invention, hydrogen (—H) or hydroxy (—OH) group or a mixture thereof is selected as a substituent of $R^2$. The most preferred substituents for $R^2$ according to the invention comprise carboxylic acids, which are naturally abundant and/or rather inexpensive to synthesize and have the most technical significance. Furthermore, said loaded acids do beneficially not comprise basic groups like the amino-group (—NH$_2$), which would interfere with their intended acid-reactive character according to the invention.

Examples of preferred loaded carboxylic acids according to the invention are shown in the following figure, comprising $C_1$-$C_4$ short-chain carboxylic acids like formic-, acetic-, glycolic-, propionic-, lactic- and/or butyric acid or a mixture thereof, which are beneficially biocompatible and bioavailable as discussed above. Herein, the invention has the advantage that these short-chain carboxylic acids, which normally (e.g., at r.t.) occur in liquid form, are present as a solid within the salt. Thus, loaded short-chain carboxylic acids can be handled in the powder form, which is highly relevant for security purpose and makes dilution beneficially not necessary.

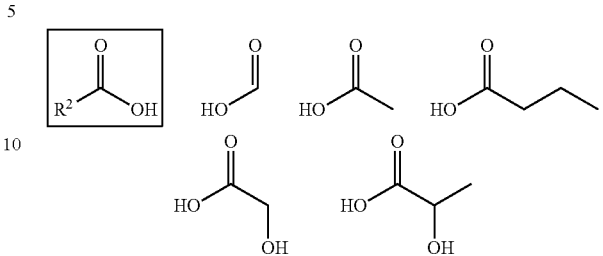

The $pK_a$ of the first acidity of the preferably used $R^2COOH$ short-chain carboxylic acids are given in the following Table 2:

TABLE 2

The preferably used $R^2COOH$ short-chain carboxylic acids according to the invention and the $pK_a$ values thereof.

| acid | $pK_{a1}$ |
|---|---|
| formic acid | 3.77 |
| glycolic acid | 3.83 |
| lactic acid | 3.86 |
| acetic acid | 4.76 |
| butyric acid | 4.82 |
| propionic acid | 4.88 |

The preferred loaded acids exhibit beneficially high acidity, thus being effective acidifiers for a broad field of industry applications whilst requiring control of reactivity for storage, transport, and security to facilitate their economic handling, as possible due to this invention.

Regarding the criteria of the $pK_a$-difference of the carrier acid and the loaded acid according to the invention, the $pK_a$ of the loaded carboxylic acids advantageously enables the choice of several ligand counterions $(R^1COO)^{(m+1)-}$ or $(R^1COO)_{2-m}^{(m+1)-}$. Herein, a wide range of carboxylic acid loaded carboxylic acid salt carrier combinations can be generated and customized.

Said acid loaded carrier are beneficial for a broad field of applications. It has been shown that the compound according to the invention is suitable as an anti-microbial preservative in cosmetic, pharmaceutical, food, and feed applications. Besides antimicrobial, preservative and hygiene functions, carboxylic acids and their salts such as formic acid and formates have shown to espouse significant zootechnical efficacy in weight gain of fattening pigs along with propionic acid and propionates (Nutrition Research Reviews, 1999).

The compound according to the invention is further suitable for the use as a nutraceutical additive in human and animal nutrition supplementation, e.g. when loaded with lactic acid. Lactic acid, like other nutraceuticals, is a natural substance that can be extracted from biological sources and can hence provide important health benefits when incorporated into the compound of invention, e.g. as an additive when included in the food matrix.

A further advantage is the usability of di- or tricarboxylic acids as loaded carboxylic acid, wherein $R^2$ comprises one or two protonated carboxylic acid groups (—COOH), preferably protonated carboxylic acid groups, which can associate to the metal ion $M^{2+}$ with multiple carboxylic groups (polydentate ligands) or a loaded carboxylic acid ($R^2COOH$), wherein $R^2$ comprises at least one amino group (—$NH_2$) and/or at least one hydroxy group (—OH) both thus lead to a higher affinity to the carrier carboxylic acid salt, especially to the metal ion $M^{2+}$, and thus increases the rate of physisorption (physical adsorption) of the loaded carboxylic acid on within the solid compound. Preferably, the $R^2$ of the loaded acid comprises at least one hydroxy group (—OH). This effect greatly enhances the stability of the solid compound and thus preferably allows $2<n\leq 10$, most preferably $2<n\leq 6$. For example, the loaded carboxylic acid is oxalic acid, citric acid, itaconic acid, malic acid, maleic acid, tartaric acid, salicylic acid, glycolic acid, succinic acid, adipic acid, ascorbic acid or a mixture thereof, preferably lactic acid, glycolic acid, salicylic acid or a mixture thereof.

As a preferred embodiment of the invention, the compound of invention may be constituted of the same acid or of a mixture of loaded carboxylic acid(s) $R^2COOH$. A compound comprising several loaded carboxylic acids $R^2COOH$ enables the customized tuning of the overall acidic strength of the acid loaded carrier. The Fédération Européenne des Fabricants d'Adjuvants pour la Nutrition Animale explicitly recommends the inventive combination of such carboxylic acids with medium-chain fatty acids for increased growth performance.

A variety of synthetic routes according to the invention with formate as a carboxylic acid carrier loaded with carboxylic acids such as lactic, acetic and butyric acid will beneficially yield compounds which are in line with EU feed additive regulations and fulfill a multitude of functions ranging from hygiene control to preservation to growth promotion.

According to a preferred embodiment, the loaded acid is selected from the group consisting of acetic acid (HAc), propionic acid (HProp), formic acid (HFo), lactic acid (HLac), salicylic acid (HSal) or a mixture thereof.

According to a preferred embodiment of the present invention, the substituent $R^1$ of the carrier carboxylic acid differs from the substituent $R^2$ of the loaded carboxylic acid $R^2COOH$ ($R^1 \neq R^2$). For example, this could be useful to provide a solid compound, e.g., a preservative, comprising a wide series of acids in the molecule for providing various combinations of acid anions.

It is herein advantageously that the molar mass of the loaded carboxylic acid ($R^2COOH$) is lower than the molar mass of the carrier carboxylic acid ($R^1COOH$).

Ratio of the Loaded Acid or Salt to the Carrier Acid (n)

The molar ratio of the loaded carboxylic acid to the carrier carboxylic acid salt n is important, as it beneficially defines the ratio of reactive to carrier components. Therefore, n beneficially sets the concentration of acid(s) in the compound of invention and facilitates a customized reactivity for final applications.

Typically ranges of the molar ratio n are comprising $0.1\leq n\leq 10$, preferable according to the invention n is comprising $0.5\leq n\leq 8$, most preferably according to the invention n is selected in the range $1<n\leq 6$. It has been shown that compounds characterized by a molar ratio n within the preferred ranges according to the invention possess high acidic efficacy, whilst being stabile. Herein loading of the carboxylic acid on the carboxylic acid loaded carboxylic acid salt carrier and/or high molar concentration of the carboxylic acid is possible, providing economic transport, storage and use under consideration of security aspects.

Preferably the molar ratio n is comprising $2\leq n\leq 10$, more preferably n is comprising $2<n\leq 10$, most preferably according to the invention n is selected in the range $2<n\leq 6$, e.g., n is at least 2.5 up to 6, preferably n is more than 3.0.

Additionally, alteration of the ratio n can be customized in a facile way, which is the variation of the molar feed ratio of the starting materials according to the process of invention.

As a preferred embodiment of the invention, the solid compound of the invention comprises less than 2 equivalents of water relative to the carrier carboxylic acid, more preferred less than 1 equivalents of water, most preferred less than 0.5 equivalents of water, e.g., less than 0.4, 0.3, 0.2, 0.1. For example, the excess of water may be removed via a desiccant (a hygroscopic substance that is used to remove water) or a controlled heating. Preferably, the compound of invention comprises water by less than 10.0 wt %, more preferably less than 8.0 wt %, in particular less than 7.0 wt %, most preferred less than 6.0 wt %. On the one hand, this is advantageous because the stability of the acids is increased, thus avoiding unnecessarily increased storage and transport costs. On the other hand, the water content does not have to be included in the calculation of the required amount of acid.

The structure of the solid compound may comprise a second or further loaded carboxylic acid $R^4COOH$, wherein $R^2$ and $R^4$ are independently selected as defined above for $R^2$, preferably selected from an optionally substituted $C_1$-$C_{10}$-alkyl group, an optionally substituted mono- or polyunsaturated $C_1$-$C_{10}$-alkyl group or an optionally substituted aryl group, wherein the substituents are preferably selected from carbonyl group (=O), carboxylic acid group (—COOH), preferably protonated carboxylic acid group, amino group (—$NH_2$), hydroxy group (—OH), halogen or cyano group (—CN) or a mixture thereof.

As mentioned above, $R^4$ (as defined above for $R^2$) preferably comprises one or two carboxylic acid groups (—COOH), preferably protonated carboxylic acid groups, which can associate to the metal ion $M^{2+}$ with multiple protonated carboxylic groups (polydentate ligands) or a loaded carboxylic acid ($R^4COOH$), preferably protonated carboxylic acid groups, wherein $R^4$ comprises at least one amino group (—$NH_2$) and/or at least one hydroxy group (—OH) both thus lead to a higher affinity to the carrier carboxylic acid salt, especially to the metal ion $M^{2+}$, and thus increases the rate of physisorption (physical adsorption) of the loaded carboxylic acid on within the solid compound. Preferably, the $R^2$ of the loaded acid comprises at least one hydroxy group (—OH). This effect greatly enhances the stability of the solid compound and thus preferably allows $2<n\leq 10$, most preferably $2<n\leq 6$. For example, the loaded carboxylic acid is oxalic acid, citric acid, itaconic acid, malic acid, maleic acid, tartaric acid, salicylic acid, glycolic acid, succinic acid, adipic acid, ascorbic acid or a mixture thereof, preferably lactic acid, glycolic acid, salicylic acid or a mixture thereof.

According to a preferred embodiment the second loaded acid is selected from the group consisting of acetic acid (HAc), propionic acid (HProp), formic acid (HFo), lactic acid (HLac), salicylic acid (HSal) or a mixture thereof. More preferably, the second loaded carboxylic acid is selected from acetic acid (HAc), propionic acid (HProp), formic acid (HFo), lactic acid (HLac) or a mixture thereof.

It may be useful to provide a solid compound, e.g., as a preservative, comprising a wide series of acids in the molecule for providing various combinations of acid anions. Thus, according to a preferred embodiment of the present invention, the substituent $R^1$ of the carrier carboxylic acid, the substituent $R^2$ of the loaded carboxylic acid $R^2COOH$ and the substituent $R^4$ of the second loaded carboxylic acid $R^4COOH$ are different ($R^1 \neq R^2 \neq R^4$).

It is herein advantageously that the molar mass of the loaded carboxylic acid(s) $R^2$ and/or $R^4$ are greater than the molar mass of the carrier carboxylic acid $R^1$.

Nevertheless, it may be useful to provide an increased concentration of an acid or acid anion, e.g., to adjust a buffering effect within a product or a solution. Thus, according to a preferred embodiment of the present invention, the substituent $R^1$ of the carrier carboxylic acid and the substituent $R^4$ of the second loaded carboxylic acid $R^4COOH$ are ($R^1=R^4$), and differ from the substituent $R^2$ of the loaded carboxylic acid $R^2COOH$ ($R^2 \neq R^1$ and $R^2 \neq R^4$).

It is herein advantageously that the molar mass of the loaded carboxylic acid $R^2$ is lower than the molar mass of the carrier carboxylic acid $R^1$ and the second loaded carboxylic acid $R^4$, respectively.

Typically, the molar ratio of the second loaded carboxylic acid to the carrier carboxylic acid salt o ranges from $0.1 \leq o \leq 10$, preferably o ranges from $0.5 \leq o \leq 8$, most preferably o is selected in the range $1 < o \leq 6$.

According to a preferred embodiment the sum $n+o \leq 1$, more preferably $n+o \geq 2$, most preferably $n+o > 2$, wherein in each case the sum of n+o is not greater than 10, preferable not greater than 8, most preferably n+o is not greater than 6. Thus, the sum of n+o is for example at least about 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9 or at least about 5.0.

Polarity/Dipole-Character/Hydrophilic-Lipophilic Balance

A Carrier and a loaded component of an inclusion compound must possess a certain attractive interaction or cohesion to enable the required physisorption, which can be related to the polarity of the organic acid components.

The concept of polarity refers to the separation of charge which can induce a dipole moment, e.g. between atoms in a covalent bond or between two ions of opposing charge. Generally, dipole moments arise from differences in electronegativity EN. It implies, that the carbonyl group (—C=O), carboxylic acid (—COOH), amino group (—NH$_2$) or hydroxy group (—OH) affect the overall polarity of the substituted carboxylic acid components of the invention, as the EN of the heteroatoms differ significantly from the $EN_C$ of carbons.

It applies that the overall polarity or the dipole moment respectively affects important parameters like the solubility, the aggregation state and the stability of the acid loaded carrier compound of this invention.

A suitable and facile descriptor for the net polarity of the organic acids of the invention is described by the ratio of polar groups, for example which are selected from hydrophilic groups like a carbonyl group (—C=O), carboxylic acid (—COOH), amino group (—NH$_2$) or hydroxy group (—OH), to lipophilic organic groups like (—CH$_1$—, —CH$_2$—, —CH$_3$—, and =CH$_1$—). For sake of simplicity, the length of the alkyl chain with respect to the number of polar/hydrophilic groups or the organic acid is beneficially indicative for the tendency of an organic acid to possess polar interaction forces, and therefore to estimate, predict and control the properties relevant for the invention.

The overall tunable polarity of the components of the invention by the choice of the components possessing a certain lipophilic/hydrophilic character is highly beneficial for their use for emulsion formulations. Therefore, the compound according to the invention is e.g. useful as an active ingredient in cosmetic and pharmaceutical applications, especially for acidity regulation in pH-defined skin cleansing products, to aid cleansing effects in razor soaps or to support disinfection in wash-lotions.

It has been shown that an increased stability of the compound is obtained by combining components of the invention possessing high polarity, referring to derivatives which comprise lipophilic groups. As increased stability of the compound of invention directly correlates with security aspects, the facile estimation of the polarity of the components beneficially enable to design compounds of defined stability or handling security, respectively. Therefore, customized compounds can be selected according to the polarity features of the single components, considering the individual conditions for transport and storage. Oversea shipping may for example require more stable compounds than required for short time transport.

The overall polarity of the components of the invention is inevitably bound to the tendency of the components to adsorb water, in short hygroscopicity. As water is the side product released in the course of the process of invention, the estimation of the overall polarity of the components predicts the conditions for drying the acid loaded carrier, e.g. whether extensive drying under reduced pressure or high accelerated temperature is required. This estimation is highly relevant for the economic planning of manufacturing processes.

The prediction of hygroscopicity facilitates a purposeful choice of suitable containers and the effective suppression of the suspension of water molecules among the component's molecules if possible. Herein, physical changes of the compound of invention, e.g., changes in volume, boiling point, viscosity or any other physical characteristics or properties are beneficially mitigated.

Flowability (Based on Size & Cohesion or Polarity or Hygroscopy)

The present invention provides a solid inclusion compound prepared as a powder that exhibits good flowability. The flowability describes the relative mobility of a bulk of particles among neighboring particles or refers to the ability of a powder to flow.

The obtained good flowability of the powdered carrier systems of this invention beneficially facilitates good powder product quality, manufacturing efficiency, transport security and storage in the broad field of powder processing industries. Amongst the general affect for the flowability like the bulk density and the cohesion properties of the component within the inclusion compound as discussed above, the particle size and the particle size distribution have a major influence on the flowability of powders (compare Baker et al., 1979) as discussed below.

Particle Size

The particle size and particle size distribution serve as suitable indicators for the flowability for the carboxylic acid loaded carboxylic acid salt carrier. The particle size of a powder compound is typically defined by the mean particle diameter day, which is the diameter of most of the particles present for a given particle-size distribution of a powder. Typically, the mean particle diameter $d_{av}$ of the free-flowing powders comprises mean particle diameter 10 μm$\leq d_{av} \leq$500 μm, preferably according to the invention is a mean particle diameter in the range of 20 μm$\leq d_{av} \leq$300 μm, more preferably according to the invention is a mean particle diameter in the range 50 μm$\leq d_{av} \leq$250 μm.

It appeared, that the therein preferred particle size range beneficially assures optimal flowability of the compound of invention, providing the multitude of advantages of flowability as discussed above, whilst beneficially mitigating the presence of aerosol particles. Aerosol particles possess typically a size of a few nanometers in diameter and tend to form heterogeneous mixtures with the ambient gas, e.g. air, which is harmful if the suspended particles are inhaled through the lungs. It has been shown that if the compound of invention possesses preferred size-ranges as stated hereinabove, the generation of undesired aerosols is beneficially avoided. Therefore, the compound of invention supports health protection whenever in contact with living creatures during processing and handling.

It has further been shown that the preferred diameter range of the particles of the compound of invention further facilitates an optimal loading capacity. Usually, the amount of components which may be loaded onto a particulate carrier increases with decreasing bulk diameter of the particles, based on the increase of the relative surface of the carrier particles. Therefore, the preferred size range primarily supports flowability, and secondarily the optimal range between smaller particle sizes to support high loading capacity and sufficiently large particles to mitigate the appearance of aerosol features.

Particle Size Distribution

Next to the particle size, the particle size distribution serves as a suitable indicator for the flowability of the carboxylic acid loaded carboxylic acid salt carrier. The particle size distribution of a powder compound is generally described by the mean particle diameter ($d_{X0}$), which defines the portions of particles with a given diameter smaller or larger than the value $X0_{vol}$%.

The particle diameter distribution $d_{50}$ of the compound of invention may comprise 10 $\mu m \leq d_{50} \leq 800$ μm, preferably comprising 10 $\mu m \leq d_{50} \leq 500$ μm, in particularly 20 $\mu m \leq d_{50} \leq 300$ μm, and is more preferably selected from 50 $\mu m \leq d_{50} \leq 250$ μm.

The therein defined particle diameter distribution represents a low dispersity of the particle size of the free-flowing powder of invention. A low particle size dispersity as an essential factor for the flowability of the powdered carrier compound of invention beneficially facilitates good powder product quality. If the compound of invention is for example applied in the pharmaceutical industry, the powder flow behavior dictated by the particle size distribution facilitates e.g. a defined weight bottling and content uniformity of pharmaceutical compounds.

According to the invention a narrow size distribution is beneficial and at least 50% of weight, preferably at least 90% of the powdered acid loaded salt carrier has a particle diameter less than 450 μm. Therein described narrow size distribution is defined by the $d_{90}$. The particle diameter distribution $d_{90}$ of the compound of invention comprises 10 $\mu m \leq d_{90} \leq 1.000$ μm, is preferably chosen from 50 $\mu m \leq d_{90} \leq 800$ μm, is more preferably selected from 150 $\mu m \leq d_{90} \leq 450$ μm.

The therein defined particle diameter distribution $d_{90}$ allows an even higher uniformity if compared to the $d_{50}$ parameter for the powdered $C_1$-$C_4$-carboxylic acid loaded salt carrier. Next to the benefits of a defined $d_{50}$, the preferred ranges for the $d_{90}$ values support the efficiency and the security for any powder-processing manufacturing processes. For example, gravity feeding, and smooth and precise powder dosing is facilitated in commercial scale, which is true for the compounds as evidenced via diffraction granulometry. For example, regular flow of powders out of vertical bins or silos for the size-defined acid-loaded salt carrier storage advantageously avoids capacity shortfall and production interruption that would otherwise involve costly loss of production time.

By appropriate design of the reaction parameters (e.g., stirring time, time and intensity of the drying process), the mean particle diameter and/or the particle diameter distribution of the solid compound according to the invention can be optimally adapted to the requirements of the particular use/application of the solid compound without carrying out damaging mechanical grinding processes.

The Base

According to the invention the carrier carboxylic acid is reacted with a base to form the acid salt carrier. In this invention the term "base" is applicable to a wide variety of bases. Conventionally, hydrated inorganic bases or more useful bases consisting of metal cations of positive charge $M^{1+}$, twofold positive charge $M^{2+}$ or triple fold positive charge $M^{3+}$ are selected for acid-base reactions. Most satisfactory results for the compound of invention are obtained from bases comprising bivalent metal bases $M^{2+}$.

The bivalent metal ion $M^{2+}$ is typically selected from the group consisting of iron (Fe), copper (Cu), zinc (Zn), manganese (Mn), tin (Sn), lead (Pb), nickel (Ni) or an alkaline earth metal ion, preferably calcium (Ca), magnesium (Mg), barium (Ba), or a mixture thereof. Bivalent metal ions carry a twofold positive charge, which is advantageous for the composition and stoichiometry of the compound of the invention.

According to a preferred embodiment of the present invention $M^{2+}$ is an alkaline earth metal ion, preferably calcium (Ca), magnesium (Mg), barium (Ba) or a divalent metal ion selected from iron (Fe), copper (Cu), zinc (Zn), manganese (Mn), tin (Sn) or a mixture of thereof.

According to the invention, $M^{2+}$ is preferably selected from iron (Fe) or an alkaline earth metal ion, preferably calcium (Ca), magnesium (Mg), barium (Ba), or a mixture thereof. The preference of the therein selected bivalent metal ions for the compound of the invention is based on their bioavailability, benefiting from the amenability given in their abundance in nature.

More preferably according to the invention, $M^{2+}$ is selected from an alkaline earth metal ion, preferably calcium (Ca), magnesium (Mg), or a mixture thereof. Apart from the benefits of the use of calcium or magnesium related to their beneficial stoichiometry as seen in their use for the compound of invention, calcium or magnesium possess bioavailability and biocompatibility. Moreover, they are essential in biochemical pathways as magnesium is e.g. important for neurogenerative processes like muscular contraction, for blood coagulation or for vitamin resorption, whereas calcium is an important building block of bones and teeth. Therefore, the incorporation of calcium or magnesium within the carrier acid/salt structure enables the generation of a digestible compound, eligible as a nutritional supplement improving human and animal health. An example of a digestible compound of invention with health benefits is given by formulations comprising calcium or magnesium citrate. The use of a said compounds according to the invention are therefore suitable as a zootechnical additive in animal nutrition such as a gastrointestinal tract acidifier or non-antibiotic growth promoter.

The use of a compound according to the invention, especially comprising alkaline earth metal ions like Ca and/or Mg, is suitable as a flavoring and palatability agent in pharmaceutical, food, and feed applications. The acid acetate loaded carrier according to the invention for instance can be used to impart salt and vinegar flavor to potato chips or salad dressings. Herein, the compound of invention can replace conventional formulations containing potassium or sodium diacetate, thus offering an alternative to the limited permission of Alkali-formulations in cosmetic products in the EU according to the European Commission.

Almost any calcium- or magnesium base may be used in the reaction with the carrier carboxylic acid to form the acid salt carrier. However, in a preferred embodiment of the invention the alkali earth metal base is selected from calcium hydroxide ($Ca(OH)_2$), calcium oxide (CaO), calcium carbonate ($CaCO_3$), magnesium oxide (MgO), magnesium hydroxide ($Mg(OH)_2$) or magnesium carbonate ($MgCO_3$), beneficially serving as low-cost starting materials for the synthesis of the compound of invention.

The choice of the employed alkali earth metal base determines the kind and amount of the condensate released upon the acid-base reaction between the carrier carboxylic acid and the metal base to form the acid salt carrier according to the invention, which is a byproduct. Furthermore, the counterion of the alkali earth metal base, e.g. carbonate ($CO_3^{2-}$), oxide ($OH^-$) or hydroxide ($OH^-$), determines the reaction heat released in the course of the exothermic acid-base reaction between the carrier carboxylic acid and the metal base to form the acid salt carrier according to the invention.

The use of alkali earth metal carbonate as a starting material leads e.g. to significant heat release upon instantaneous and exothermic $CO_2$ formation, which can e.g. be exploited to ease the drying process. Hence, the choice of the employed alkali earth metal base facilitates the tuning of thermal conditions of the process of invention. The released gaseous carbon dioxide further beneficially supports the mixing within a reaction vessel and is a reliable indicator for the finishing of the acid-base reaction. The use of alkali earth metal hydroxides and oxides as bases is a preferred embodiment according to the process of the invention, generating water as side product.

If water is released as a side product, the formed condensation water generates micro-compartments between the particulate components, comprising the carrier carboxylic acid and the metal base and improves the reaction environment for the acid-base reaction, as the condensation water serves as a solvent for the residual, still unreacted reaction partners. Following, the presence of water as a side product serves to generate micro-compartments of accelerated reaction rate, which promotes a full conversion of the reactants. The in-situ generation of water as a solvent is especially important for the preferred solvent free reaction processes, as it compensates for possibly poor mixing or reaction partner contact, respectively.

In conclusion, the compound of invention is based on cheap starting materials and comprises nothing but organic components, which are carboxylic acids and/or carboxylic salts, and an alkaline earth metal base, possessing beneficially biocompatibility and/or digestibility. As further no additives or catalysts are required, an economic processing of organic acids on an industrial scale is facilitated.

Advantages and Description of the Process
General Processing of Loaded Acids

The loaded carboxylic acid(s) may be loaded onto the carrier in a variety of ways. Generally, any method which provides intimate contact between the components generating the carrier carboxylic acid salt carrier are suitable to provide a homogeneous, free-flowing, non-caking compound according to the invention. The components must have a sufficient fluidity for good dispersion so that upon contact with each other, the carboxylic acid to be loaded is substantially uniformly dispersed throughout the weight of carrier particles.

Thus, the carrier salt may be loaded in several ways. Typically, the particles are in contact with each other in the gaseous phase by passing an inert gas, which is capable of vapor deposing possibly liquid components upon spraying, through a quantity of the particles in a fluidized bed apparatus or while the particles are positioned on a static or moving screen device.

PROCESSES OF INVENTION

This invention envisions the loading of the carrier salt particles, preferably solvent-free, by simultaneously generating the carrier salt from its corresponding acid and by entrapping the loaded carboxylic acid(s) within the carrier structure in an in-situ fashion. The compound of invention is obtained by a facile manufacturing process comprising the mixing of the carrier carboxylic acid, the loaded carboxylic acid(s) and the alkaline earth metal base, and the subsequent drying of the obtained compound under control of the temperature, moisture, and particle size.

A process for preparing the carboxylic acid loaded carboxylic acid salt carrier of the invention has been found, wherein the starting materials, comprising the carrier carboxylic acid, the loaded carboxylic acid and the alkaline earth metal base are gently mixed, where the carrier carboxylic acid $(R^1COO)^{(m+1)-}$ or $(R^1COO)_{2-m}^{(m+1)-}$ is either premixed with the base, named ex-post process, or more preferably premixed with the loaded carboxylic acid $R^2COOH$, named in-situ process. For both preferred embodiments of the process of invention the exothermic acid-base reaction, which is a resulting between the alkaline earth metal base and the carrier carboxylic acid salt generating the carrier structure, must be performed next to the loading of the latter with the short-chain carboxylic acid(s).

The ex-post process is a preferred process for preparing the compounds according to the invention. First, alkaline earth metal base comprising $M^{2+}$ with the carrier carboxylic acid $(R^1COO)^{(m+1)-}$ or $(R^1COO)_{2-m}^{(m+1)-}$ are premixed. This mixture is stirred below the boiling point of the most volatile compound present until the carrier carboxylic acid salt $(M^{2+})_{1+m}(R^1COO)_2^{(m+1)-}$ or $M^{2+}(R^1COO)_{2-m}^{(m+1)-}$ is generated and homogeneity of the carrier compound is obtained. The homogeneous mixture is dried, however, drying can advantageously be omitted and the homogeneous mixture obtained is sieved prior to the addition of the loaded carboxylic acid $R^2COOH$ and subsequently stirred below the boiling point of the most volatile compound present until homogeneity of the compound is obtained. Finally, the obtained mixture is dried for a second time, preferably followed by grinding and sieving the obtained powder. The advantage of the ex-post process resides in meantime drying and the sieving, facilitating in-between size-selection and purification, thus beneficially decreasing the extent required for these steps at the end of the process of invention. Therefore, the ex-post process may be preferred in instances where the compounds require extensive grinding.

In an embodiment of the preferred process of the invention, the carrier carboxylic acid salt $(M^{2+})_{1+m}(R^1COO)_2^{(m+1)-}$ or $M^{2+}(R^1COO)_{2-m}^{(m+1)-}$ is purchased as a starting material to be loaded with the carboxylic acid $R^2COOH$. This embodiment of the preferred process of invention is suitable if the carrier carboxylic acid is available for low-costs or if the orders for the compound of invention fluctuate.

According to an alternative preferred embodiment of the ex-post process, first, alkaline earth metal base with the carrier carboxylic acid $(R^1COO)^{(m+1)-}$ or $(R^1COO)_{2-m}^{(m+1)-}$ are premixed. This mixture is stirred below the boiling point of the most volatile compound present until the carrier carboxylic acid salt $(M^{2+})_{1+m}(R^1COO)_2^{(m+1)-}$ or $M^{2+}(R^1COO)_{2-m}^{(m+1)-}$ is generated and homogeneity of the carrier compound is obtained. The loaded carboxylic acid $R^2COOH$ is added to the homogenous mixture by utilizing the remaining heat generated by the exothermic carrier salt reaction and subsequently stirred below the boiling point of the most volatile compound present until homogeneity of the compound is obtained. Finally, the obtained mixture is dried, preferably followed by grinding and sieving the obtained powder.

The more preferred process of invention for preparing the compound of invention comprises initial acid mixing where all compounds are added simultaneously, named in-situ process. In the in-situ process the carrier carboxylic acid $(R^1COO)^{(m+1)-}$ or $M^{2+}(R^1COO)_{2-m}^{(m+1)-}$ and the to be loaded carboxylic acid $R^2COOH$ are premixed until homogeneity of the mixture is obtained. After the initial acid mixing, the alkaline earth metal base, comprising the $M^{2+}$ alkaline earth metal ion, is added to this mixture of carboxylic acid compounds to be stirred below the boiling point of the most volatile compound present. Finally, the obtained mixture is dried, preferably followed by grinding and sieving the obtained powder.

However, the in-situ generation of the compound of invention allows beneficially the syntheses of the carrier, whilst grinded with the acid to be loaded, thus facilitating effective an inclusion of the latter, resulting in high carboxylic acid load if compared to the ex-post process. Furthermore advantageously, the in-situ process of the invention makes an intermediate drying step unnecessary, as required in an embodiment of the ex-post process.

However, all components (base, ligand acid, and loading/free acid) can technically be added in any order in one reaction vessel, as the components are anticipated to form the desired product of invention according to their chemical properties through resalting.

The Starting Materials

According to the process of invention, starting materials are preferably used in concentrated form, therein beneficially impacting the effective reaction probability, reducing the reaction time and the overall manufacturing process, respectively. Therefore, liquid acid concentrations over 70% are preferred, acid concentrations greater than 95% are more preferred. However, the suitable concentration of liquid starting materials are known from a skilled person, referring to good laboratory practice.

The person skilled in the art knows that solid starting materials are preferably dry and of homogeneous particle size. Furthermore, the person skilled in the art is aware of the preference for small particle sizes for mixed reaction processes, enabling a maximum surface area of the reactants and the greatest possible homogeneity of the mixture. The therein preferred particle sizes and size distributions advantageously minimize the mechanical energy input required for mixing during a reaction in the dry state.

Temperature

The mixing of short chain carboxylic acids is generally performed in a temperature range between $0°\,C.<T<25°\,C.$, preferably according to the invention between $0°\,C.<T<20°\,C.$, most preferably according to the invention between $5°\,C.<T<15°\,C.$ below the boiling point of any components under atmospheric pressure. Maintaining the preferred temperature-ranges during the process of invention, beneficially prevents an evaporation of the starting materials and an undesired solidification upon freezing of the reaction mixture.

However, the present invention is not limited to the temperature range as preferred for the process of invention. Other temperature ranges may for example serve to release a defined amount of loaded acids, enabling the customization of the degree of carboxylic acid loading. The amount of residual loaded carboxylic acid can be quantified by the carboxylic acid released, e.g. by thermal analysis like thermogravimetric analysis (TGA).

Mixing Conditions/Time

Besides temperature control, a gentle addition of the starting materials for the exothermic acid-base reaction in the course of the process of invention beneficially avoids high thermal energy inputs upon the released reaction heat. Therefore, the reaction conditions are beneficially controlled, the security of the manufacturing process is ensured, and caking of the product is avoided.

Generally, the particulate compounds are in contact with each other for a period of time sufficient to finish the acid-base reaction and to physically load the particles with the intended amount of loaded carboxylic acid according to the invention. The reaction time of the process of invention is typically limited to a minimum time until the reaction is finished, which is generally less than 150 minutes, preferably less than 90 minutes and more preferably less than 20 minutes. However, the optimal reaction time strongly depends on the starting materials and the batch size employed and the apparatus employed.

The therein defined reaction time of the process of invention beneficially suppresses an uncontrolled release of the loaded acids, caking, moisture entry or undesired post-reaction temperature increase due to mechanical energy entry upon mixing. Controlled mechanical energy entry is further supported via gentle and steady mixing, beneficially diminishing agglomeration or poor flow properties of the product of invention, respectively.

Water Content & Agglomeration

Agglomeration, the process wherein many small particles assemble to larger macrostructures, is farther efficiently suppressed when the present amount of water is reduced. However, water may be inevitable generated in the course of the acid-base reaction forming the carrier salt structure if water is the condensate released, e.g. if a hydroxyl alkaline earth metal base is employed. The water content is typically analyzed using a method based on the Karl-Fischer titration method according to ISO 760:1978 (cf. U.S. Pat. No. 4,703,014). Characteristically, particulate powder formulations are comprising less than 15.0 wt % percent water by weight (wt %). Preferably, the amount of water by weight of the particulate acid loaded carrier compound according to the invention is less than 10.0 wt %, more preferably less than 5.0 wt % to provide a flowable acid loaded carrier compound of the invention. The mitigation of the agglomeration due to the restricted amount of water in the product of invention beneficially facilitates the prevention of serious problems occurring elsewise, including primarily bad flowability, impeded powder filling and deteriorated particle size uniformity.

The TGA-graph of a compound obtained from the process of invention, magnesium formate with loaded propionic acid (MgFo-HProp [2], see FIG. 4(A)), validates the low water content as no water is released upon constant heating of the sample in a temperature range from $1°\,C.$ to $300°\,C.$ However, the compound of invention does not have to be completely anhydrous. As long as the amount of water does not exceed the amount of water required for agglomeration of the particles, which is an individual parameter regarding the choice of components, a partly hydrated acid loaded carrier may still be suitable for the versatile uses of the present invention.

Drying

After the resalting, which is the acid-base reaction forming the carrier salt structure, a possibly partially hydrated acid loaded carrier is obtained, which is further processed upon drying, grinding and sieving to a dried and size-selected free flowing powder of invention to provide a commercially saleable, particulate, free-flowing product.

Drying provides a pure acid loaded carrier compound according to the invention, as possible side products of low molecular weight, e.g. condensation water, are removed. As the boiling point of the side products, especially water, and the loaded acids(s) differs, a controlled thermal purification of the compound of invention is beneficially facilitated. Evidence for the successful drying of the compound of invention is e.g. given by thermogravimetric analysis (TGA).

As discussed above, the drying according to the process of invention is preferably performed at temperatures 5° C.<T<15° C. below the boiling point of any components of the compound of invention to beneficially keep the intended molar ratio of the compounds according to the feed ratio. Therefore, the feed ratio of the carrier carboxylic acid to the loaded carboxylic acid(s) can be assumed to be equal to the loading capacity of the compound of invention. According to the invention, immediate cooling of the acid loaded carrier to room temperature after the process of invention mitigates a slow evaporation of the loaded acid(s), therefore beneficially keeping the intended molar ratio of the components of the compound of invention according to the feed ratio.

The reaction heat released in the course of the exothermic reaction generating the carrier carboxylic acid, e.g. upon in-situ neutralization, can be maintained, e.g. via the use of isolated reaction vessels, and beneficially be exploited for the work-up of the obtained compound of invention, for example for drying purpose. Therefore, less time for drying the carboxylic acid loaded carboxylic acid salt carrier is advantageously required if compared to a drying procedure at room temperature (r.t.).

The drying is typically performed by using suitable dryers, selected from fluid bed dryers, vacuum dryers, spray-dryers, paddle dryers or conventional vacuum drying systems. As the compound of invention may be selected from components with low boiling point, thermal degradability and low vapor pressure, gentle conditions for the purification and/or drying are favored. Therefore, a preferred drying according to the invention is conducted in such a manner that the loaded acid(s) are not evading from the final acid loaded salt carrier product, e.g. by evaporation or desorption.

The preferred drying and grinding according to the process of invention provides a material of low water content, controlled particle size and bulk density, respectively.

Granulation

Powdered $C_1$-$C_4$-carboxylic acid loaded salt carrier according to the invention are produced by milling or grinding until a flowable powdered compound is obtained. A subsequent sieving facilitates to discriminate sizes above a desired size-limit of the powdered acid loaded carrier salt. Both grinding and sieving are essential steps for the size-selection of the compound of invention, enabling beneficially good flowability.

Next to the benefits provided by flowable powders as discussed above, grinding generates a high relative surface area, water release is enhanced, and thus final drying is supported.

In this regard, dry granulation effectively reduces ongoing agglomeration and in turn facilitates better control of the final particle size. Furthermore, less mechanical energy is required for breaking agglomerates into smaller particles, decreasing advantageously the overall energy entry during grinding. In a preferred embodiment of the invention, the powdered starting materials are simultaneously grinded and dried. The conditioning preferably takes place simultaneously with the milling or grinding process in conditions of absolute air humidity of at least 17 g water/kg dry air, preferably between 17 to 30 g water/kg dry air (cf. EP 0838529 B1). In this manner, the agglomeration of many small individual particles of powdered short chain carboxylic acids into larger spherical macrostructures is effectively prevented.

Packaging

The loaded carboxylic acids are hygroscopic and therefore steadily absorb water. In a preferred embodiment of the invention, the dried and grinded compound of invention is released in a transportable form under prevention of moisture, preferably by filling into bottles or bags. The compounds are preferably packed in accordance with good manufacturing practice (GMP) such as outlined in Title 21 Part 110 of the Code of Federal Regulations. For this purpose, common packaging according to industry practices such as sealed polyethylene (PE) containers, or bags of other materials, e.g. fibered polypropylene with PE inner foils or PE linings are suitable.

In any case, the container should be sealed to avoid undesired increase of moisture for the products of invention, beneficially keeping their advantageous properties until applied by the customer. With this step of invention, even the atmospheric relative humidity at room temperature at European latitudes, which is ca>70%, is accounted for. Herein, the acids cannot absorb water in such large quantities that they can deliquesce as it occurs without protection of moisture, and the flowability for the acid loaded carrier solid compound as assured.

Use of the Compound

The compound according to the invention is effective as an acidity regulator, as a buffering system, for preservation purpose or as a flavoring agent in a broad field of pharmaceutical, cosmetic, food, and feed industry where it improves shelf life, supports the safety in food chain production, improves odor and/or increases palatability.

Thus, the present invention also comprises the use of a solid compound as defined herein for acidity regulation and/or as a buffering agent in cosmetic, pharmaceutical, food, and feed applications.

Furthermore, the present invention also comprises the use of a solid compound as defined herein as an anti-microbial preservative in cosmetic, pharmaceutical, food, and feed applications.

The present invention also relates to the use of a solid compound as defined herein as a flavoring and palatability agent in pharmaceutical, food, and feed applications.

It is furthermore the solid compounds as defined herein can be used as a color retention agent in food, and/or feed applications.

In addition it applicable to use the solid compounds as defined herein as a zootechnical additive in animal nutrition such as a gastrointestinal-tract acidifier or non-antibiotic growth promoter.

It is also provided, that the solid compounds as defined herein can be used as a nutraceutical additive in human and animal nutrition supplementation The invention also comprises the use of a solid compound as defined herein as an active ingredient in cosmetic and pharmaceutical applications. More preferably, the present invention comprises a solid compound as defined herein for use in cosmetic and pharmaceutical composition, more preferably as an active ingredient.

EMBODIMENTS, EXAMPLES AND REALIZATION

The present invention is further described and illustrated in the following comparatives, experiments, drawings and examples, which are not intended to limit the scope of the invention in any manner.

Herein shows

FIG. 1: the schematic representation of the ex-post process for manufacturing the inventive carboxylic acid loaded carboxylic acid salt carrier from the components of the carrier carboxylic acid $(R^1COO)_{2-m}{}^{(m+1)-}$ or $(R^1COO)_2{}^{(m+1)-}$, the loaded carboxylic acid(s) $R^2COOH$, and earth metal base, comprising $M^{2+}$.

Figure 2:
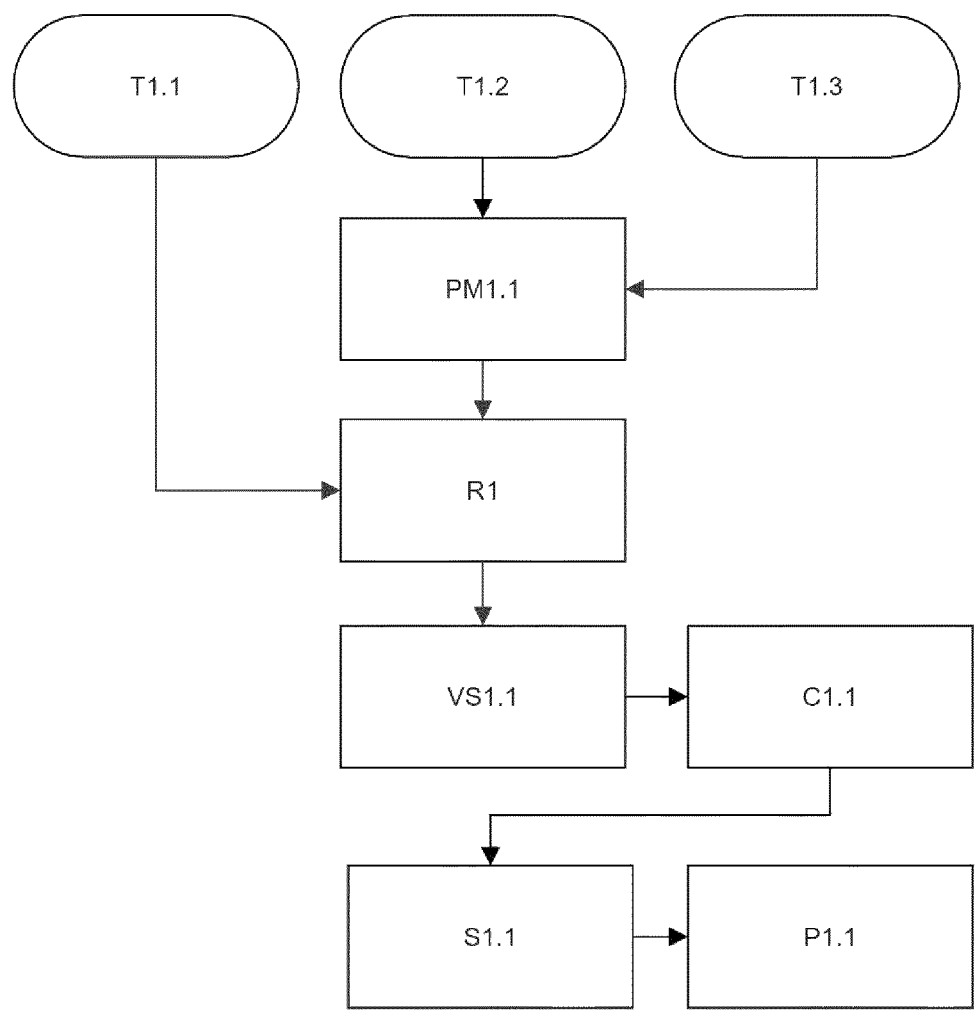

FIG. 2: the schematic representation of the in-situ process for manufacturing the inventive carboxylic acid loaded carboxylic acid salt carrier from the components of the carrier carboxylic acid $(R_1COO)_{2-m}{}^{(m+1)-}$ or $(R^1COO)_2{}^{(m+1)-}$, the loaded carboxylic acid(s) $R^2COOH$, and earth metal base, comprising $M^{2+}$.

Figure 3:
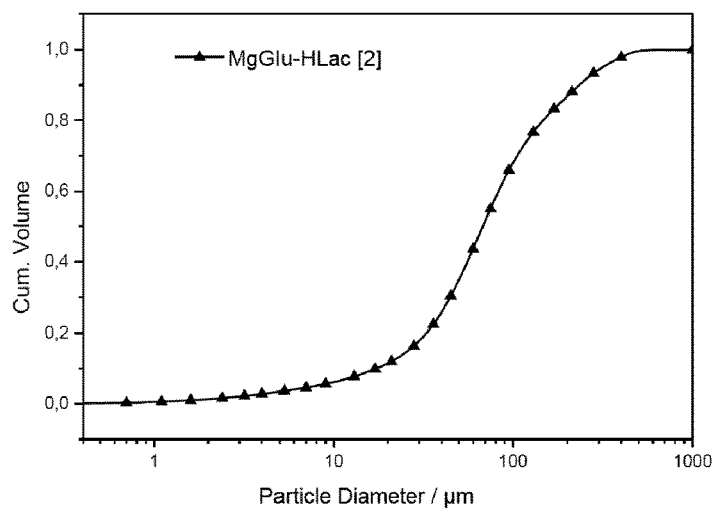
Figure 3:
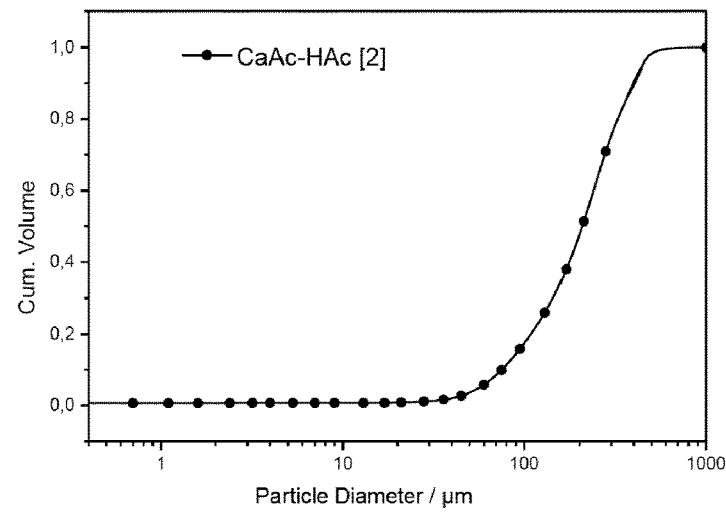
Figure 3:
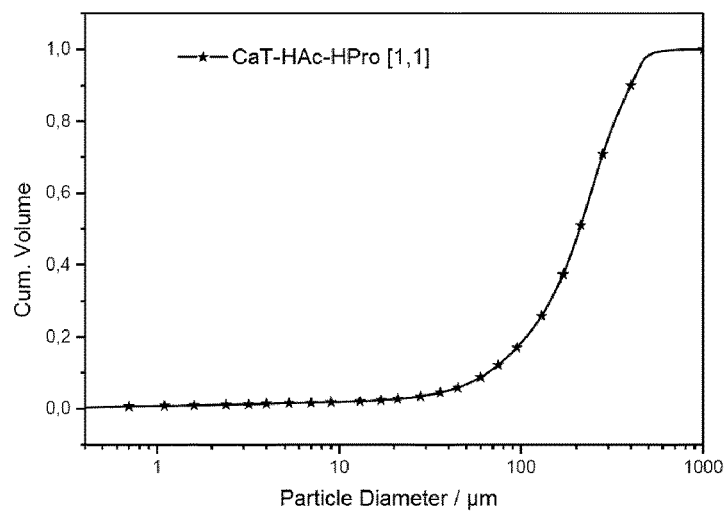

FIG. 3: the distribution curve of the particle diameter by cumulative volume (cum. volume) of the sample magnesium glutamate with loaded lactic acid MgGlu-HLac [2] in FIG. 4(A), calcium acetate with loaded acetic acid CaAc—HAc [2] in FIG. 4(B) and calcium tartrate with loaded acetic acid and propionic acid CaT-HAc—HProp [1,1] in FIG. 4(C).

FIG. 4(A): the graph of the thermogravimetric analysis (TGA) of the dry sample MgFo-HProp [2], by the loss of weight as a function of increasing temperature (whilst exposed to a constant heating rate).

FIG. 4(B): the graph of the differential thermal analysis (DTA) of the dry sample MgFo-HProp [2] showing the caloric phenomena as a function of increasing temperature (whilst exposed to a constant heating rate).

Figure 5:
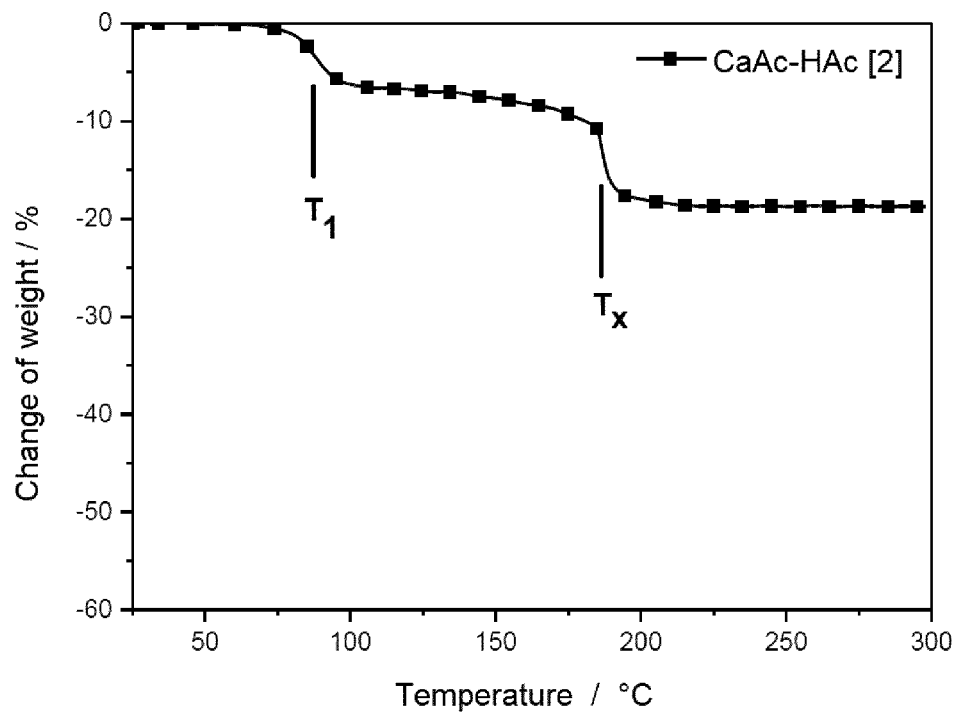
Figure 5:
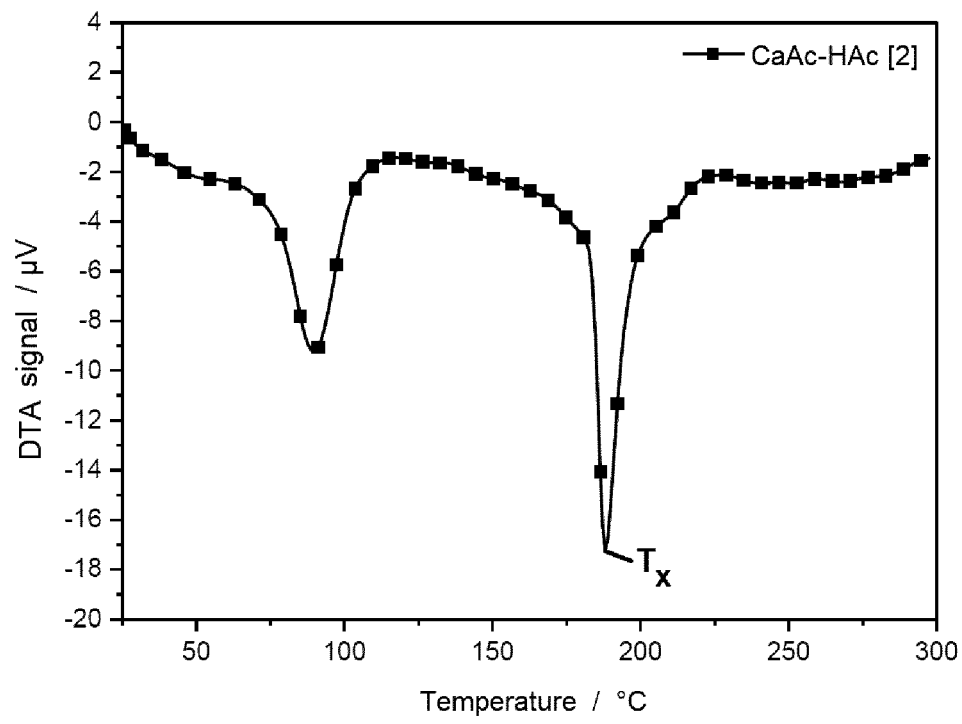

FIG. 5(A): the graph of the thermogravimetric analysis (TGA) of the partially hydrated sample CaAc—HAc [2], which was not dried after the synthesis, displaying the loss of weight as a function of increasing temperature (whilst exposed to a constant heating rate) and two second-order phase transitions of dehydration and desorption of the loaded carboxylic acid.

FIG. 5(B): the graph of the differential thermal analysis (DTA) of the partially hydrated sample CaAc—HAc [2], which was not dried after the synthesis, displaying the caloric phenomena as a function of increasing temperature (whilst exposed to a constant heating rate) and two distinct endothermic physicochemical phenomena in agreement to the trends observed for TGA analysis of CaAc—HAc [2].

Figure 6:
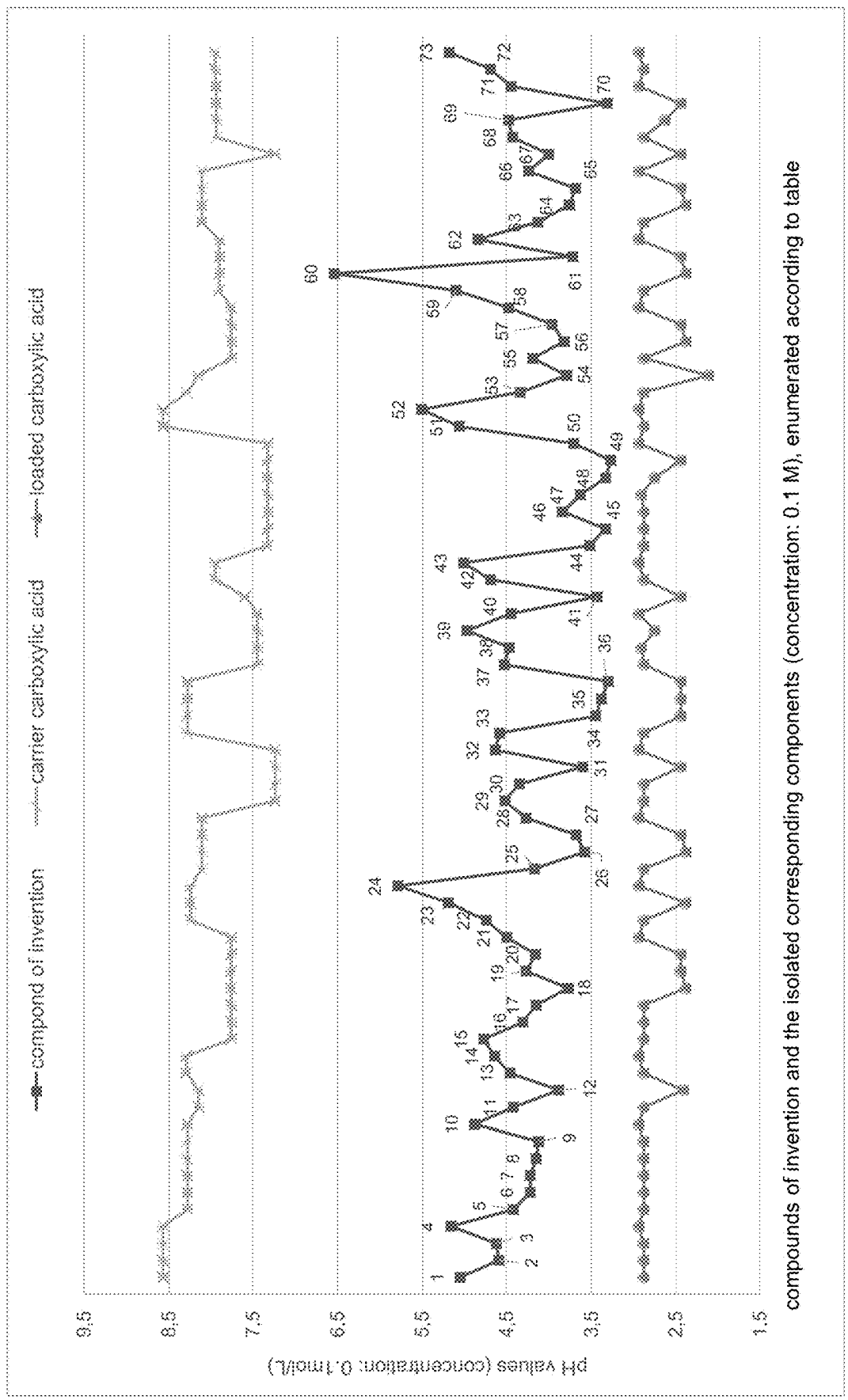

FIG. 6: pH values of several representative compounds of invention compared to the pH values of the corresponding isolated components thereof, which are the loaded carboxylic acid(s) $R^2COOH$ and the carrier carboxylic acids $(R^1COO)_{2-m}{}^{(m+1)-}$, constituting a pair of measurements along the vertical axis. Each of the 73 pairs is assigned with a number 1-73, referencing to the according number explained in the table 5. All measurements were performed at 0.1 molar (M) concentration (c) of the samples, which is 0.1 mol per liter (mol/L). The pH difference of the compounds of invention compared to the pH of the corresponding carrier carboxylic acid and/or the loaded carboxylic acid(s) indicates the acid efficacy of the inventive compounds. The reader is referred to the table 5 for the listed values, which are the base of this figure.

Figure 7:
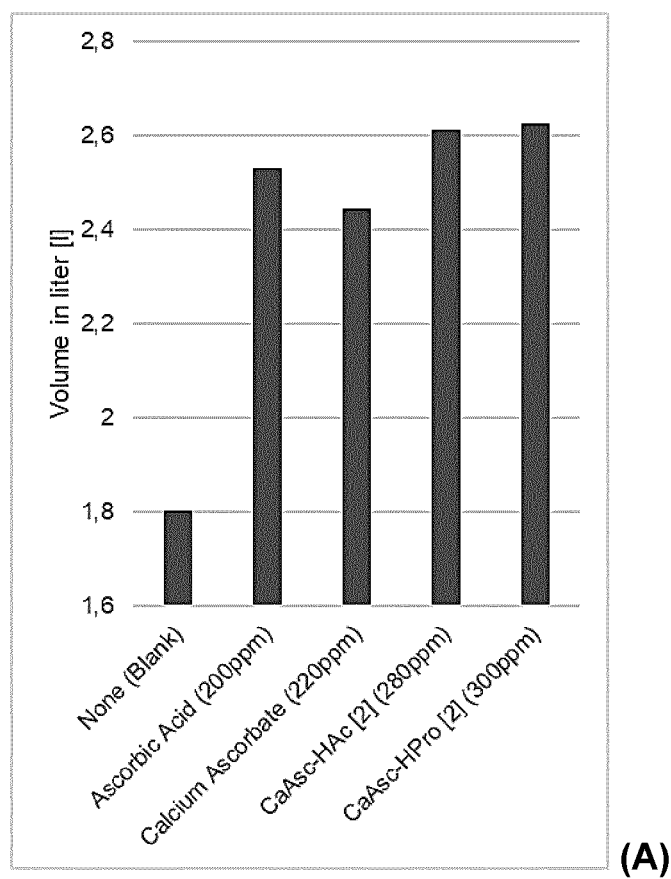
Figure 7:
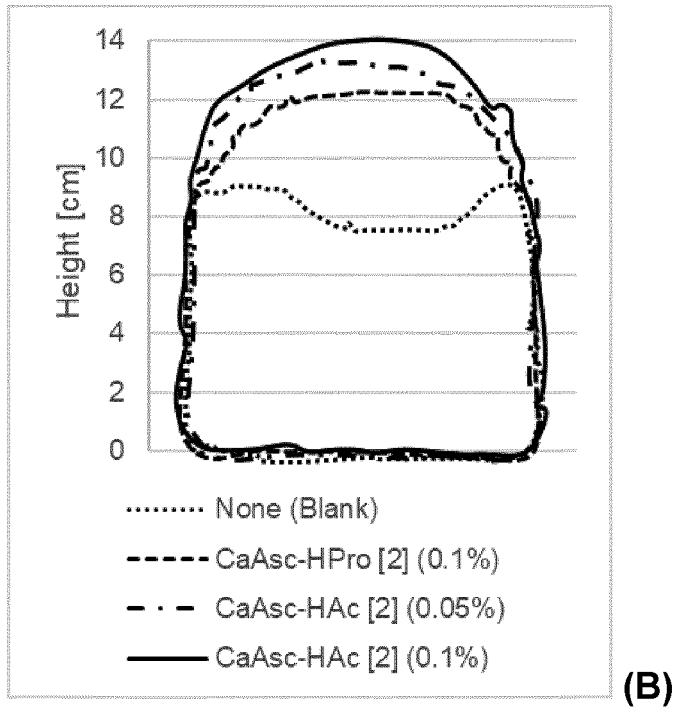

FIG. 7(A): volume comparison of french style bread (FSB) in liters, proofing the applicability the compound of invention for the use as a preservative in bakery goods (example 12). The bread samples were exposed to the dosing of the compounds of invention according to the description at the x-axis.

FIG. 7(B): comparison of the areal cross sections of the samples of FIG. 7(A) and related to example 12.

Figure 8:
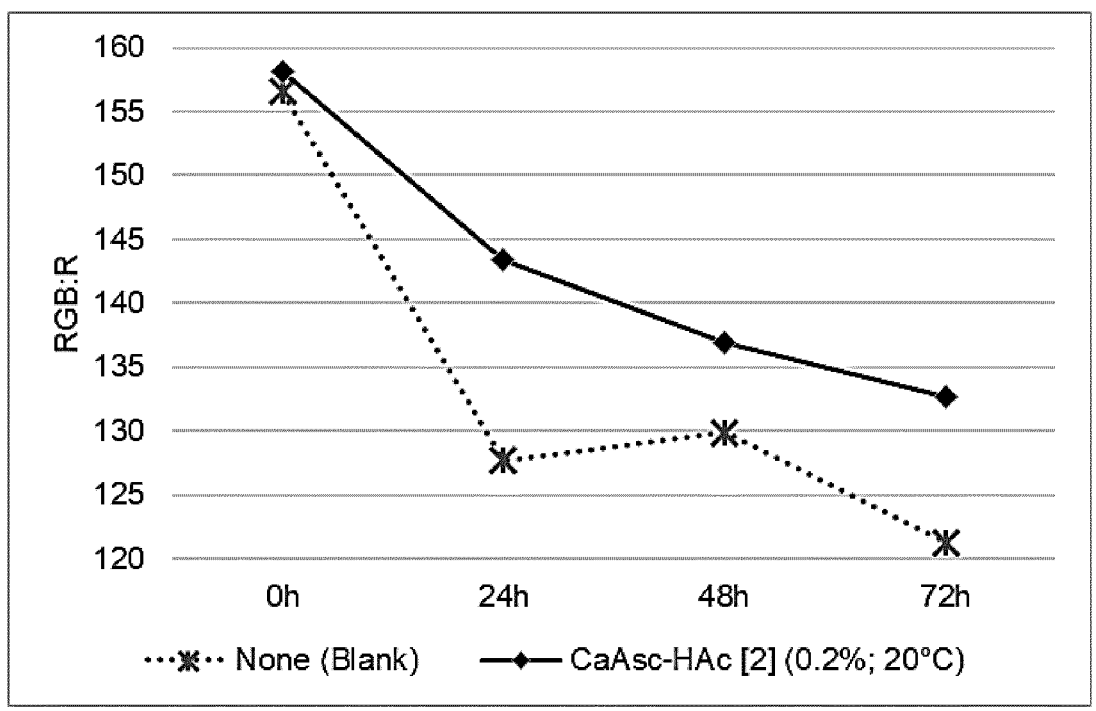

FIG. 8: color development of a beef chuck steak blank sample (crosses) and a beef chuck steak sample calcium acetate with loaded acetic acid (CaAsc-Hac [2], raute) in dependency of the time as described in example 13. The colors of the RGB:R were transformed to black/white color.

Figure 9:
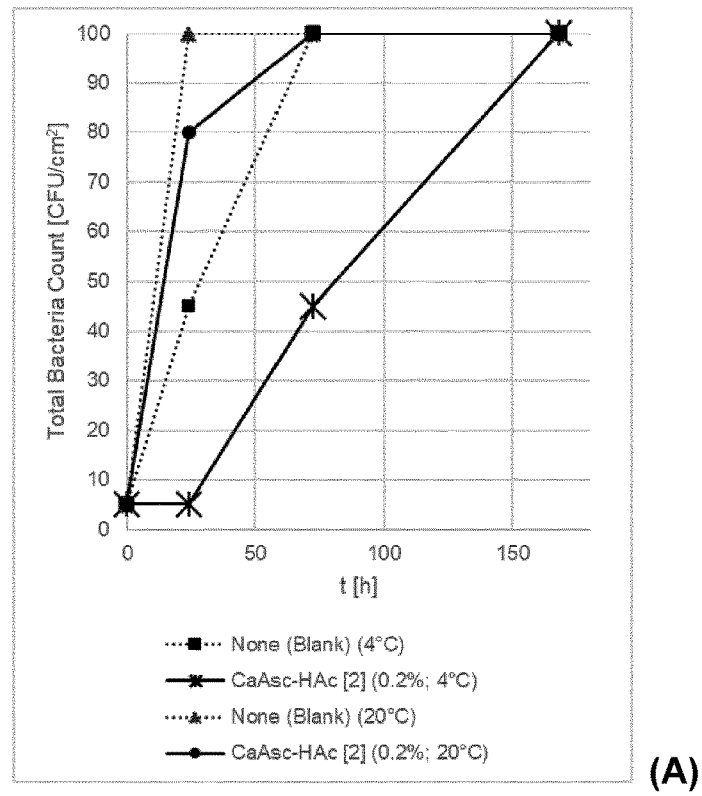
Figure 9:
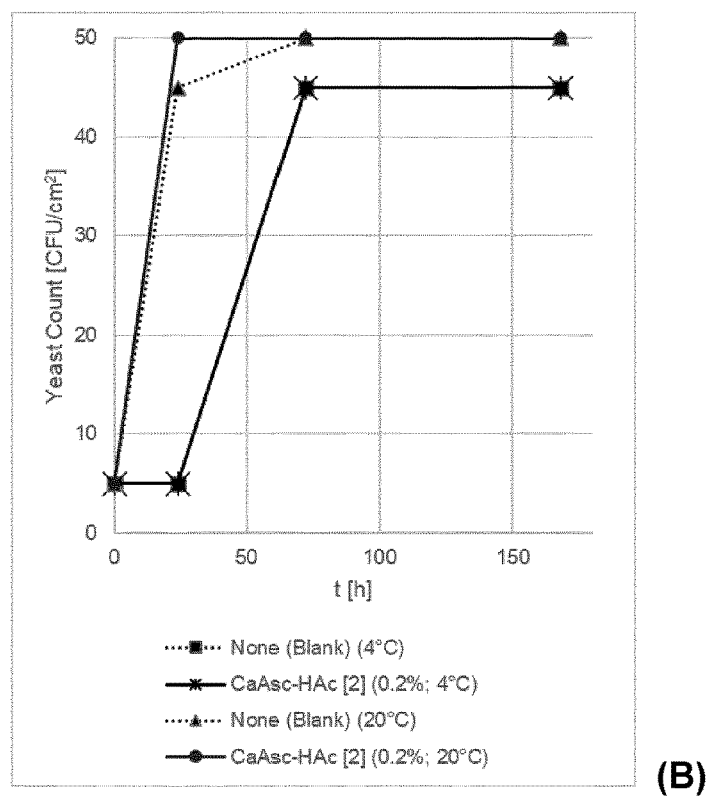

FIG. 9(A): total bacteria count of the samples described in example 14, showing the usability of compounds of invention as preservative in meat products.

FIG. 9(B): total yeast count of the samples described in example 14, showing the usability of compounds of invention as preservative in meat products.

FIG. 10(A): the results of the test proofing the preservation effectiveness by testing for the total bacteria count (TBC, see example 15).

FIG. 10(B): the results of the test proofing the preservation effectiveness by testing for the total yeast/fungi count (see example 15).

FIG. 10(C): the results of the test proofing the preservation effectiveness by testing for the Enterobacteria/β-Glucoronidase-positive-Enterobacteria (E/β) count (see example 15).

LIST OF REFERENCE SYMBOLS USED IN THE FIGURES (T1.2) tank
(PM1.1) premixer
(M1.1) mixer
(P1.1) packaging device
(S1.1) sieve
(SM1.1) sieve mill
(VS1.1) vacuum drying system
(C1.1) mill/nibbler List of Abbreviations for the Carboxylic Acids and Salts The following table 3 lists examples of starting materials of the preferred embodiment of the compound of invention next to their $pK_a$'s and some relevant boiling points ($T_{b,acid}$) for acidic forms, which are preferably used as loaded carboxylic acids. The abbreviations are used for the compound names as described in the nomenclature below.

TABLE 3

Abbreviations (first column) of components used for the names of preferred compounds according to the invention, next to the names for the salt- and acidic forms of the components and the acidic strength of the acidic form of the components ($pK_{a1}$).

| abbreviation | salt form | acidic form | $pK_{a1}$ | $T_{b,\,acid}$ |
|---|---|---|---|---|
| Asp | aspartate | aspartic acid | 1.99 | |
| Glu | glutamate | glutamic acid | 2.16 | |
| Mal | malonate | malonic acid | 2.83 | |
| T | tartrate | tartaric acid | 2.98 | |

TABLE 3-continued

Abbreviations (first column) of components used for the names of preferred compounds according to the invention, next to the names for the salt- and acidic forms of the components and the acidic strength of the acidic form of the components ($pK_{a1}$).

| abbreviation | salt form | acidic form | $pK_{a1}$ | $T_{b, acid}$ |
|---|---|---|---|---|
| Sal | salicylate | salicylic acid | 2.75 | |
| Fum | fumarate (trans) | fumaric acid | 3.00 | |
| Cit | citrate | citric acid | 3.09 | |
| Ma | malate | malic acid | 3.40 | |
| Fo | formate | formic acid | 3.77 | 101 |
| Gly | glycolate | glycolic acid | 3.83 | 75 |
| Lac | lactate | lactic acid | 3.86 | 122 |
| Asc | ascorbate | ascorbic acid | 4.25 | |
| Suc | succinate | succinic acid | 4.19 | |
| Ben | benzoate | benzoic acid | 4.20 | |
| Ad | adipate | adipic acid | 4.43 | |
| Ac | acetate | acetic acid | 4.76 | 118 |
| Bu | butyrate | butyric acid | 4.82 | 163 |
| Prop | propionate | propionic acid | 4.88 | 141 |

Nomenclature

If not indicated elsewise, the name of the carrier salt $M^{2+}(R^1COO)_{2-m}^{(m+1)-}$ is separated by the loaded, functional acid(s) ($R^2COOH$) by a minus (–), wherein the carrier is always named in front of the loaded carboxylic acid component. Brackets [ . . . ] indicate the molar equivalents of loaded acid(s) with respect to the carrier salt and correspond to n as outlined in the claims.

List of Compound Names

TABLE 4

Exemplary names used for several preferred compounds according to the invention, based on the abbreviations of the compounds given in table 3, next to the explanations of the names and the molar ratio of the loaded carboxylic acid to the carrier carboxylic acid salt carrier:loaded acid(s).

| compound name | explanation | carrier:loaded acid(s) |
|---|---|---|
| MgFo-HAc [2] | magnesium formate with loaded acetic acid | 1:2 |
| MgFo-HProp [2] | magnesium formate with loaded propionic acid | 1:2 |
| MgAsp-Sal [2] | magnesium aspartate with loaded salicylic acid | 1:2 |
| CaAsc-HAc [2] | calcium ascorbate with loaded acetic acid | 1:2 |
| CaAsc-HAc [3] | calcium ascorbate with loaded acetic acid | 1:3 |
| CaAsc-HProp [2] | calcium ascorbate with loaded propionic acid | 1:2 |
| MgGlu-HLac [2] | magnesium glutamate with loaded lactic acid | 1:2 |
| CaAc-HAc [2] | calcium acetate with loaded acetic acid | 1:2 |
| CaSal-HLac [2] | calcium salicylate with loaded lactic acid | 1:2 |
| CaT-HAc-HProp [1,1] | calcium tartrate with loaded acetic acid and propionic acid | 1:1:1 |
| CaT-HAc [2] | calcium tartrate with loaded acetic acid | 1:2 |
| CaT-HLac [2] | calcium tartrate with loaded lactic acid | 1:2 |
| CaT-HProp [2] | calcium tartrate with loaded propionic acid | 1:2 |
| CaCit-HAc [2] | calcium citrate with loaded acetic acid | 1:2 |
| CaCit-HFo [2] | calcium citrate with loaded formic acid | 1:2 |
| CaGlu-HAc [4] | calcium glutamate with loaded acetic acid | 1:4 |
| CaCit-HAc [6] | calcium citrate with loaded acetic acid | 1:6 |
| CaCit-HAc [2] | calcium citrate with loaded acetic acid | 1:2 |

Example 1—the General Ex-Post Process

A typical process according to the preferred ex-Post process is schemed in FIG. 1.

In the ex-post process, the alkaline earth metal base, which is present in tank T1.1, and the carrier carboxylic acid, which is present in tank T1.2, are added to the reactor (R1) whilst gently mixing. After the reaction is finished, the formed carrier carboxylic acid salt is pre-dried by using for instance a vacuum drying system (VS1.1) whilst still mixing. The product (carrier salt) in the reactor (R1) is pre-sieved (SM1.1) and directed to an intermediary tank T1.3.

The sieved carrier salt from tank T1.3 and the to be loaded carboxylic acid from tank T1.4 are released to a mixer (M1.1) whilst gently mixing. Alternatively, an externally acquired carrier salt from tank T1.5 and the to be loaded carboxylic acid from tank T1.4 are released to a mixer (M1.1) whilst gently mixing. The obtained carboxylic acid loaded carboxylic acid salt carrier product from the mixer (M1.1) is further dried whilst still mixing for instance by hyphenation to the same vacuum drying system (VS1.1) used in the previous step. The dried product from M1.1 is subsequently grinded by a mill/nibbler (C1.1) to ensure adequate particle size. After passing a sieve (S1.1) the product is packaged (P1.1).

In an embodiment of the preferred process of the invention, the carrier carboxylic acid $(R^1COO)_{2-m}^{(m+1)-}$ is purchased as a starting material to be loaded with the carboxylic acid $R^2COOH$. It has for example been shown, that purchased anhydrous calcium citrate is suitable to generate the salt carrier structure, whilst being blended with acetic acid to create calcium citrate with loaded acetic acid (CaCit-HAc). However, in this embodiment the essential character of the invention lacks and hence does not show as optimal results as the onward continued or simultaneous process according to the invention, the ex-post or in-situ process, respectively.

Example 2—the General In-Situ Process

A typical process according to the more preferred in-situ process is schemed in FIG. 2.

In the in-situ process, the alkaline earth metal base is present in tank T1.1. The ligand acid and the loading/free acid are released from tank T1.2 and from tank T1.3 respectively to be premixed in vessel (PM1.1) until a homogeneous premixture of the components is obtained. The acid premixture from PM1.1 is released to the reactor (R1). Subsequently the alkaline earth metal base from tank T1.1 is gently added to R1 whilst mixing.

After the reaction is finished, the obtained product is dried by using for instance a vacuum drying system (VS1.1). The drying is conducted in such a manner that the loaded carboxylic acid is not released, e.g. via evaporation, from the carboxylic acid loaded carboxylic acid salt carrier. The obtained carboxylic acid loaded carboxylic acid salt carrier is subsequently grinded by a mill/nibbler (C1.1) to ensure adequate particle size. After passing the sieve (S1.1), the product is packaged (P1.1).

Examples for compounds of invention successfully processed via the in-situ process are comprising different most preferred compounds of invention of a loaded carboxylic acid(s) and a carrier carboxylic acid salt, like calcium citrate with loaded formic acid with the molar ratio of n=2 (CaCit-HFo [2]), calcium tartrate with loaded lactic acid with n=2 (CaT-HLac [2]), magnesium aspartate with loaded salicylic acid with n=2 (MgAsp-Sal [2]), whereas higher acids loads are exemplary given by calcium glutamate with loaded acetic acid with n=4 (CaGlu-HAc [4]) or calcium citrate with loaded acetic acid with n=6 (CaCit-HAc [6]).

Example 3—In-Situ Synthesis MgFo-HAc

This example represents the laboratory synthesis of magnesium formate with loaded acetic acid, MgFo-HAc [2], via the most preferred in-situ process according to the invention.

As starting materials for MgFo-HAc [2], magnesium oxide (MgO) with a purity of >97% and particle size of <0.03 mm, glacial acetic acid ($CH_3COOH$) with a purity of 99-100% and formic acid ($CH_2O_2$) with a purity of >96% were used.

The chemical equation describes the synthesis of MgFo-HAc [2]:

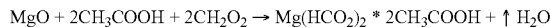

$$MgO + 2CH_3COOH + 2CH_2O_2 \rightarrow Mg(HCO_2)_2 * 2CH_3COOH + \uparrow H_2O$$

A solution of 41.55 g MgO, 120.10 g $CH_3COOH$ and 95.90 g $CH_2O_2$ was stirred for 30 minutes at ambient temperature (23° C.) in a sealed 5 dl thermo-glass beaker.

A white paste was obtained and dried at 95° C. for 45 min to obtain a white, solid, free-flowing and dust-free product.

PH measurements are suitable to determine the acidity of the obtained carboxylic acid loaded carboxylic acid salt carrier MgFo-HAc [2], which is characteristic for the loaded, physisorbed loaded acetic acid. The acidic efficiency of the loaded acetic acid within the magnesium formate carrier structure was evidenced by the comparison of the obtained pH values to the isolated magnesium formate as reference material. The pH value of MgFo-HAc [2] (pH 5.10 at 0.1 M and at r.t.) was evidently lower than the pH value of the reference material magnesium formate (pH 7.90 at 0.1 M and at r.t.) and hence, it is concluded that magnesium formate as a carboxylic acid salt carrier was successfully generated according to the process of invention, beneficially providing a repository function for excess free acetic acid.

Example 4—In-Situ Synthesis CaT-HAc—HProp [1,1]

This example represents the laboratory synthesis of calcium tartrate with loaded acetic acid and propionic acid, CaT-HAc—HProp [1,1], via the most preferred in-situ process according to the invention.

For the production of calcium tartrate with 2 molar equivalence of free loaded acetic acid and propionic acid 1:1 (CaT-HAc—HProp [1,1]), calcium hydroxide ($Ca(OH)_2$) with a purity of >98% and particle size of <0.02 mm, glacial acetic acid ($CH_3COOH$) with a purity of 99-100%, tartaric acid ($C_4H_6O_6$) with a purity of >99% and propionic acid ($C_2H_5COOH$) with a purity >99.5% were used.

The chemical equation describes the synthesis of CaT-HAc—HProp [1,1]:

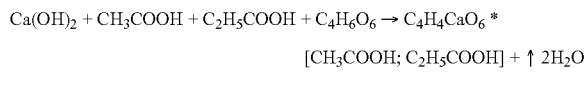

$$Ca(OH)_2 + CH_3COOH + C_2H_5COOH + C_4H_6O_6 \rightarrow C_4H_4CaO_6 *$$
$$[CH_3COOH; C_2H_5COOH] + \uparrow 2H_2O$$

For this, 23.29 g of $Ca(OH)_2$, 18.5 g of $CH_3COOH$, 46.46 g of $C_4H_6O_6$ and 22.93 g of $C_2H_5COOH$ were mixed for 30 minutes at ambient temperature (23° C.) in a sealed 5 dl thermo-glass beaker. A white, hydrated paste was obtained, and the water side-product was evaporated at 95° C. for 5 min to obtain a grey, solid, free-flowing and dust-free product.

Evidence of the successful loading of propionic acid and acetic acid and the acidic efficiency of the compound of invention was evidenced by comparison of CaT-HAc—HProp [1,1] to the acidity to isolated calcium tartrate. The pH value of CaT-HAc—HProp [1,1] (pH 3.63 at 0.1 M and at r.t.) was evidently lower than the pH value of the reference material calcium tartrate (pH 7.33 at 0.1 M and at r.t.) and hence, it is concluded that calcium tartrate with loaded acetic acid and propionic acid was successfully generated according to the process of invention, beneficially providing a repository function for excess free acetic acid.

Example 5—Comparison Between In-Situ Process and Ex-Post Process

This example demonstrates the comparison between the in-situ process and the ex-post process for the generation of calcium tartrate with loaded acetic acid with 2 molar equivalence of loaded acid (CaT-HAc [2]) as an exemplary the compound of invention.

In-situ process: This example showcases the laboratory synthesis of a carboxylic acid loaded carboxylic acid salt carrier CaT-HAc [2] according to the more preferred in-situ process of invention as opposed to the preferred ex-post process of this invention.

For the production of CaT-HAc [2], calcium hydroxide ($Ca(OH)_2$) with a purity of >98% and a particle size of <0.02 mm, glacial acetic acid ($CH_3COOH$) with a purity of 99-100% and tartaric acid ($C_4H_6O_6$) with a purity of >99% were used.

The following equation describes the synthesis of CaT-HAc [2]:

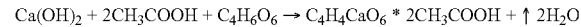

$$Ca(OH)_2 + 2CH_3COOH + C_4H_6O_6 \rightarrow C_4H_4CaO_6 * 2CH_3COOH + \uparrow 2H_2O$$

For the in-situ synthesis, 24.37 g of $Ca(OH)_2$, 38.71 g of $CH_3COOH$ and 48.62 g of $C_4H_6O_6$ were mixed for 30 minutes at ambient temperature (23° C.) in a sealed 5 dl thermo-glass beaker to avert the evaporation of reaction water and acid. The lower $pK_a$ of tartaric acid ($C_4H_6O_6$) at 2.89 in comparison to acetic acid's $pK_a$ of 4.76 enabled the simultaneous addition of all three substances whilst assuring the formation of the $C_4H_4CaO_6$ carrier structure with inbound free acetic acid.

A white, hydrated paste was obtained, and the water side-product was evaporated at 95° C. for 5 min to evaporate the water side product whilst avoiding the evaporation of acetic acid. After drying, a white, solid, free-flowing and dust-free product was obtained.

To evidence that excess acetic acid was loaded inside the calcium tartrate carrier structure and the compound of invention possess acidic features as expected for the compound of the invention, the pH of calcium tartrate acetic acid CaT-HAc [2] was compared to the pH of isolated calcium tartrate.

As a result, the pH value of CaT-HAc [2] (pH 3.56 at 0.1 M and at r.t.) was evidently lower than the pH value of the reference material calcium tartrate (pH 7.33 at 0.1 M and at r.t.) and hence, it is concluded that calcium tartrate with loaded acetic acid was successfully generated according to the process of invention, beneficially providing a repository function for excess free acetic acid.

Ex-post process: This example showcases the laboratory synthesis of a carboxylic acid loaded carboxylic acid salt carrier CaT-HAc [2] according to the preferred ex-post process of invention as opposed to the more preferred in-situ process of this invention.

For the synthesis of CaT-HAc [2] via ex-post process, calcium hydroxide [Ca(OH)$_2$] with a purity of >98% and particle size of <0.02 mm, glacial acetic acid (CH$_3$COOH) with a purity of 99-100% and tartaric acid (C$_4$H$_6$O$_6$) with a purity of >99% were used.

The following chemical equations describe the synthesis of CaT-HAc [2] via ex-post process as a two-step approach:

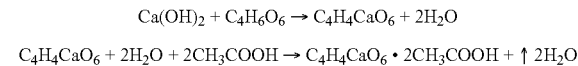

For the ex-post synthesis of CaT-HAc [2], 24.37 g of Ca(OH)$_2$ and 48.62 g of C$_4$H$_6$O$_6$ were first stirred for 30 minutes at ambient temperature (23° C.) in a sealed 5 dl thermo-glass beaker. A white hydrated powder was obtained and 38.71 g of CH$_3$COOH were subsequently added. The mixture of the three components was subsequently stirred for 10 minutes at ambient temperature (23° C.) in a sealed 5 dl thermo-glass beaker.

A white, hydrated paste was obtained, and the water side-product was evaporated at 95° C. for 10 min to evaporate the water side product whilst avoiding the evaporation of acetic acid. After drying, a white, solid, free-flowing and dust-free product was obtained.

As a result, the pH value of CaT-HAc [2] (pH 2.89 at 0.1 M and at r.t.) was evidently lower than the pH value of the reference material calcium tartrate (pH 7.33 at 0.1 M and at r.t.) and hence, it is concluded that calcium tartrate with loaded acetic acid was successfully generated according to the process of invention, beneficially providing a repository function for excess free acetic acid.

The compounds CaT-HAc [2], processed via in-situ and ex-post process, were compared. Both the in-situ process and the ex-post process facilitate the manufacturing of CaT-HAc [2] with a repository function for excess free acid. The pH value of CaT-HAc [2] via ex-post process (pH 2.89 at 0.1 M and at r.t.) and via in-situ process (pH 3.56 at 0.1 M and at r.t.) are comparable. However, for sake of economy it can be concluded that the in-situ process is most preferable due to the substantial reduction of both reaction and drying times.

Example 6—Acid Holding Capacity of the Compound of Invention

This example shows the acid holding capacity for very high carboxylic acid loading (n=4), representatively demonstrated for calcium tartrate with loaded acetic acid with 4 molar equivalence of loaded acid (CaT-HAc [4]).

The skilled person of the art knows that when providing at least two starting materials in the first step of the process according to the invention, the starting materials can be chosen one to another in stoichiometric or sub-stoichiometric ratios. To illustrate acid capacity performance of a featured carrier calcium tartrate with loaded 4 molar equivalent acetic acid, CaT-HAc [4], was synthesized according to the in-situ process of invention and analyzed with respect to the acidic strengths of the compound of the invention.

For the synthesis of calcium tartrate with loaded acetic acid CaT-HAc [4], calcium hydroxide (Ca(OH)$_2$) with a purity of >98% and particle size of <0.02 mm, glacial acetic acid (CH$_3$COOH) with a purity of 99-100% and tartaric acid (C$_4$H$_6$O$_6$) with a purity of >99% were used. The following chemical equation describes the synthesis of CaT-HAc [4]:

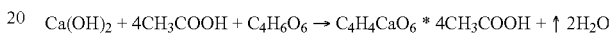

For the in-situ process of CaT-HAc [4], 17.57 g of Ca(OH)$_2$, 55.81 g of CH$_3$COOH and 35.05 g of C$_4$H$_6$O$_6$ were blended for 30 minutes at ambient temperature (23° C.) in a sealed 5 dl thermo-glass beaker. A grey paste was obtained and dried at 95° C. for 6 min to obtain a white, solid, free-flowing and dust-free product.

The pH value of CaT-HAc [4], (pH 3.33 at 0.1 M and at r.t.) was evidently lower than the pH value of the reference material calcium tartrate (pH 7.33 at 0.1 M and at r.t.) and hence, the high acidic efficiency is demonstrated, which is directly correlated to a very high loading capacity of the compound of invention CaT-HAc [4]. The successful generation of very high carboxylic acid(s) loaded compounds via most preferred in-situ process of invention is verified, beneficially providing a high-dose repository function for excess of liquid acids.

Example 7—Acidity of the Compound of Invention

This example demonstrates the acidic strength of several representative compounds of invention, which is quantified via pH measurements.

For the pH measurements, a Seven2Go portable pH meter S2 (pH measuring-range: −2 to 20; resolution: 0.01) with an InLab Ultra Micro-ISM electrode (measuring range: pH −1 to pH 11; low temperature membrane glass type; ceramic diaphragm; reference system with Ag$^+$ ion trap by argenthal) as well as with an in-lab routine pH electrode (measuring range: pH 0 to pH 14; ceramic diaphragm; reference system with Ag$^+$ ion trap by argenthal) from Mettler-Toledo AG (Analytical, Switzerland) was used.

The acidity of several representative compounds of invention is demonstrated by the comparison of the pH values of the compound of invention to the non-loaded carboxylic acid R$^2$COOH and/or to the carrier carboxylic acid salt M$^{2+}$(R$^1$COO)$_{2-m}$$^{(m+1)-}$, under comparable conditions like the solvent, the concentration, the temperature for all samples.

For sake of comparability, compounds of the same loading ratio n=2, which is 2:1 of the loaded carboxylic acid with respect to the carrier carboxylic acid, were selected for this analysis. Further examples of other loading ratios are given in table 5. The components used for this pH-characterization were dry, solid, free-flowing and exhibited complete solubility as the reference salts themselves exhibited. The analytes were dissolved in millipore water, stirred for 5 minutes in an airtight vial to perform the pH measurements thereafter at r.t. All measurements were performed at 0.1 molar (M) concentration of the samples, which is 0.1 mol per liter (mol/L).

For sake of reliability, every result stated is the average of at least three single measurements. The following table 5 summarizes the results of the pH analysis for the compound of invention (third row), the corresponding carrier carboxylic acid (fourth row) and the loaded carboxylic acid (fifth row), related to the corresponding abbreviations (second row) and numbers (first row). The numbers 1-73 (nr., first row) are used as an assignment for the 73 pairs, comprising the compound of invention (third row), the corresponding carrier carboxylic acid (fourth row) and the loaded carboxylic acid (fifth row), as used in the FIG. 6.

TABLE 5

Summarized experimental pH values of exemplary compounds of invention named (third column), next to their row wise corresponding carrier carboxylic acid (fourth column) and the loaded carboxylic acid (fifth column). The enumeration (nr.) of the corresponding pairs is consistent with the FIG. 6.

| nr. | abbreviation (compound) | pH values compound | carrier carboxylic acid | loaded carboxylic acid |
|---|---|---|---|---|
| 1 | CaAc-HAc [2] | 5.05 | 8.57 | 2.88 |
| 2 | CaAc-HAc [3.5] | 4.59 | 8.57 | 2.88 |
| 3 | CaAc-HAc [3] | 4.62 | 8.57 | 2.88 |
| 4 | CaAc-HProp [2] | 5.16 | 8.57 | 2.94 |
| 5 | CaAsc-HAc [2] | 4.42 | 8.28 | 2.88 |
| 6 | CaAsc-HAc [3] | 4.22 | 8.28 | 2.88 |
| 7 | CaAsc-HAc [4] | 4.22 | 8.28 | 2.88 |
| 8 | CaAsc-HAc [5] | 4.15 | 8.28 | 2.88 |
| 9 | CaAsc-HAc [6] | 4.12 | 8.28 | 2.88 |
| 10 | CaAsc-HProp [2] | 4.88 | 8.28 | 2.94 |
| 11 | CaAsp-HAc [2] | 4.42 | 8.15 | 2.88 |
| 12 | CaAsp-HGly [2] | 3.88 | 8.15 | 2.41 |
| 13 | CaBen-HAc [2] | 4.46 | 8.29 | 2.88 |
| 14 | CaBen-HProp [2] | 4.64 | 8.29 | 2.94 |
| 15 | CaCit-HAc [2] | 4.77 | 7.76 | 2.88 |
| 16 | CaCit-HAc [5] | 4.31 | 7.76 | 2.88 |
| 17 | CaCit-HAc [6] | 4.15 | 7.76 | 2.88 |
| 18 | CaCit-HFo [2] | 3.77 | 7.76 | 2.38 |
| 19 | CaCit-HLac [2] | 4.27 | 7.76 | 2.44 |
| 20 | CaCit-HLac [4] | 4.16 | 7.76 | 2.44 |
| 21 | CaCit-HProp [2] | 4.50 | 7.76 | 2.94 |
| 22 | CaFo-HAc [2] | 4.74 | 8.24 | 2.88 |
| 23 | CaFo-HFo [2] | 5.19 | 8.24 | 2.38 |
| 24 | CaFo-HProp [2] | 5.79 | 8.24 | 2.94 |
| 25 | CaFum-HAc [2] | 4.17 | 8.11 | 2.88 |
| 26 | CaFum-HFo [2] | 3.58 | 8.11 | 2.38 |
| 27 | CaFum-HLac [2] | 3.68 | 8.11 | 2.44 |
| 28 | CaFum-HProp [2] | 4.27 | 8.11 | 2.94 |
| 29 | CaGlu-HAc [2] | 4.52 | 7.24 | 2.88 |
| 30 | CaGlu-HAc [4] | 4.35 | 7.24 | 2.88 |
| 31 | CaGlu-HLac [4] | 3.60 | 7.24 | 2.44 |
| 32 | CaGly-HProp [2] | 4.63 | 7.24 | 2.94 |
| 33 | CaLac-HAc [2] | 4.58 | 8.28 | 2.88 |
| 34 | CaLac-HLac [2] | 3.45 | 8.28 | 2.44 |
| 35 | CaLac-HLac [3] | 3.38 | 8.28 | 2.44 |
| 36 | CaLac-HLac [4] | 3.30 | 8.28 | 2.44 |
| 37 | CaMa-HAc [2] | 4.53 | 7.45 | 2.88 |
| 38 | CaM-HAc-HProp [1,1] | 4.47 | 7.45 | 2.91 |
| 39 | CaMa-HAc-HProp-HLac [1,1,1] | 4.97 | 7.45 | 2.75 |
| 40 | CaM-HProp [2] | 4.45 | 7.45 | 2.94 |
| 41 | CaSal-HLac [2] | 3.43 | 7.59 | 2.44 |
| 42 | CaSuc-HAc [2] | 4.69 | 7.95 | 2.88 |
| 43 | CaSuc-HProp [2] | 5.01 | 7.95 | 2.94 |
| 44 | CaT-HAc [2] | 3.52 | 7.33 | 2.88 |
| 45 | CaT-HAc [4] | 3.33 | 7.33 | 2.88 |
| 46 | CaT-HAc [5] | 3.84 | 7.33 | 2.88 |
| 47 | CaT-HAc-HProp [1,1] | 3.63 | 7.33 | 2.91 |
| 48 | CaT-HAc-HPro-HLac [1,1,1] | 3.33 | 7.33 | 2.75 |
| 49 | CaT-HLac [2] | 3.27 | 7.33 | 2.44 |
| 50 | CaT-HProp [2] | 3.71 | 7.33 | 2.94 |
| 51 | MgAc-HAc [2] | 5.06 | 8.57 | 2.88 |
| 52 | MgAc-HProp [2] | 5.51 | 8.57 | 2.94 |
| 53 | MgAsc-HAc [2] | 4.34 | 8.28 | 2.88 |
| 54 | MgAsp-Sal [2] | 3.79 | 8.15 | 2.11 |
| 55 | MgCit-HAc [2] | 4.19 | 7.76 | 2.88 |
| 56 | MgCit-HFo [2] | 3.82 | 7.76 | 2.38 |
| 57 | MgCit-HLac [2] | 3.96 | 7.76 | 2.44 |
| 58 | MgCit-HProp [2] | 4.48 | 7.76 | 2.94 |
| 59 | MgFo-HAc [2] | 5.10 | 7.90 | 2.88 |
| 60 | MgFo-HFo [2] | 6.54 | 7.90 | 2.38 |
| 61 | MgFo-HLac [2] | 3.72 | 7.90 | 2.44 |
| 62 | MgFo-HProp [2] | 4.84 | 7.90 | 2.94 |
| 63 | MgFum-HAc [2] | 4.13 | 8.11 | 2.88 |
| 64 | MgFum-HFo [2] | 3.76 | 8.11 | 2.38 |
| 65 | MgFum-HLac [2] | 3.69 | 8.11 | 2.44 |
| 66 | MgFum-HProp [2] | 4.24 | 8.11 | 2.94 |
| 67 | MgGlu-HLac [2] | 4.00 | 7.24 | 2.44 |
| 68 | MgLac-HAc [2] | 4.43 | 7.94 | 2.88 |
| 69 | MgLac-HAc-HProp [1,1] | 4.48 | 7.94 | 2.63 |
| 70 | MgLac-HLac [2] | 3.31 | 7.94 | 2.44 |
| 71 | MgLac-HProp [2] | 4.45 | 7.94 | 2.94 |
| 72 | MgSuc-HAc [2] | 4.69 | 7.95 | 2.88 |
| 73 | MgSuc-HProp [2] | 5.18 | 7.95 | 2.94 |

The results given in table 5 are schemed in FIG. 6, were the pH values of the compounds of invention are compared with the paring components along the vertical axis.

The significant differences of the pH values between the compounds of invention compared to the pH of the corresponding carrier carboxylic acid salt $M^{2+}(R^1COO)_{2-m}^{(m+1)-}$ and/or the corresponding non-loaded carboxylic acid $R^2COOH$ indicate the acid efficacy of the inventive compounds as well as the stability of the carrier components.

First, the stability of the carrier carboxylic acid salt $M^{2+}(R^1COO)_{2-m}^{(m+1)-}$ is validated for all samples, as they exhibit pH values in the range 7.2<pH<8.6 (FIG. 6, crosses). This lack of acidic activity further evidences the completeness of the resalting reaction, which is the synthesis of the latter according to the process of invention. Therefore, the carrier beneficially acts as a non-reactive carrier compound as intended and facilitate to tune the acidity exclusively via the loaded carboxylic acid $R^2COOH$.

In contrast to the carrier carboxylic acid salt, the compounds of invention exhibit a significant acidity (3.3<pH<6.5, rectangles), comparable to the acidity of the corresponding isolated carboxylic acid $R^2COOH$ (FIG. 6, circles). This observation shows the acidic efficiency of the physiosorbed carboxylic acid $R^2COOH$. The acid strength upon solvation of the compounds of invention demonstrates the controlled acid release in solution, whereas the compounds of invention proofed to be beneficially stable against alternative release e.g. via thermal desorption of the loaded acids (the reader is referred to the examples 8 and 9).

As a representative example for a high loaded compound of invention, calcium tartrate with loaded lactic acid CaT-HLac [2] showed the pH 3.27 (c=0.1M), which was evidently lower than the pH value of calcium tartrate with pH 7.33 (c=0.1M) and hence, the repository function even for a molar excess compound of loaded free acetic acid (n=2) is clearly shown, further validating the technical eligibility of the process of invention.

However, all solutions containing the invention compound in water are characterized by a significant acidic pH when compared to the neutral to slightly alkaline character of the non-loaded corresponding carrier carboxylic salts.

Example 8—Thermal Analysis of a Dry Compound

This example demonstrates the thermal analysis, comprising thermogravimetry (TGA) and differential thermal analysis (DTA) for a representative compound of the invention MgFo-HProp [2] in the dry state, giving information about the release of the loaded acid(s) and the stability of the carrier structure.

Thermal analysis was carried out with a Linseis STA 1600 simultaneous thermal analyzer to determine simultaneous changes of weight (TGA signal) and caloric measurable transformations (DTA signal) in a temperature range between r.t. and 300° C. The compound of invention (100 mg) was placed on a sample holder of the measuring device and heated to 300° C. in a gas flow of 50 ml/min nitrogen upon exposure to a heating rate of 2 Kelvin per minute.

Figure 4:
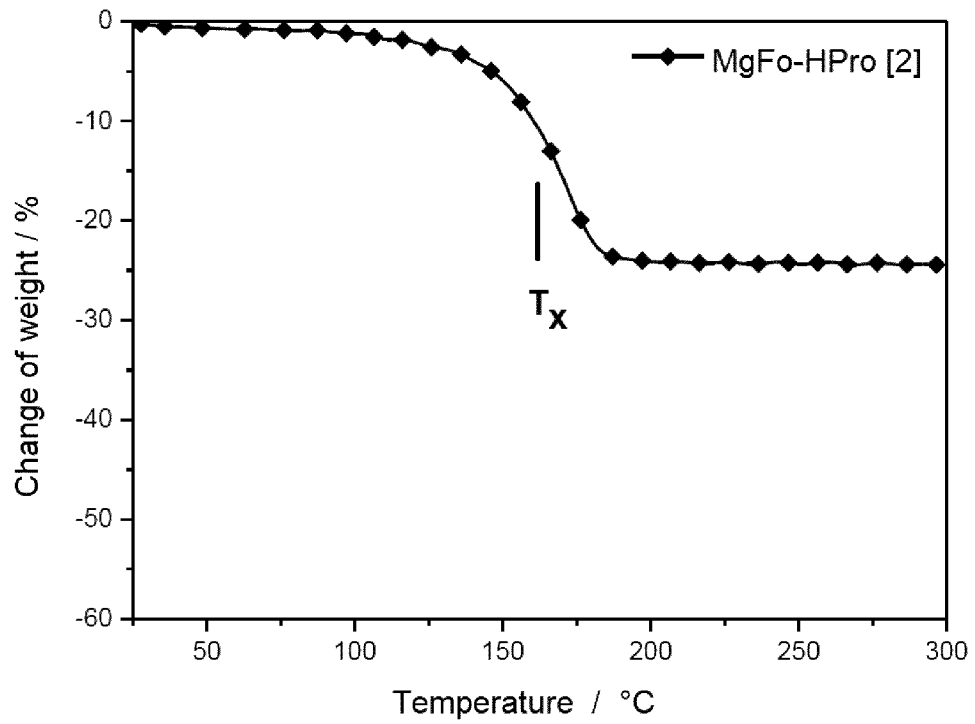
Figure 4:
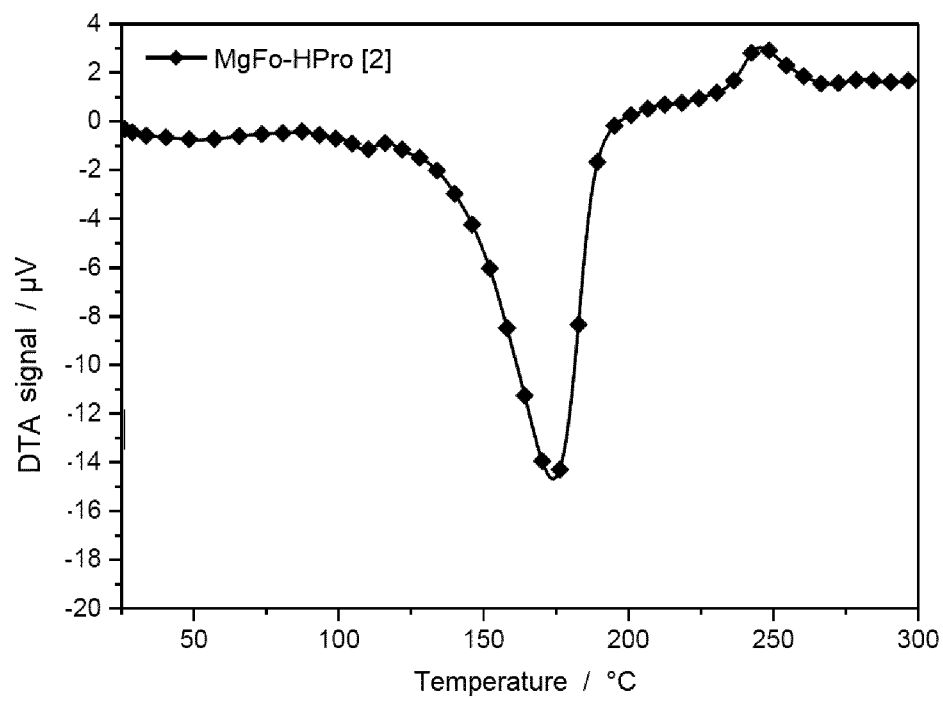

The results of the thermal characterization of sample MgFo-HProp [2] in the dry state are given in FIG. 4.

The FIG. 4(A) shows the curve obtained from the thermogravimetric analysis (TGA) of the dried sample MgFo-HProp [2] by the change of weight as a function of increasing temperature whilst exposed to a constant heating rate. A single second-order phase transition around the turning point $T_x$ is obtained. Sample MgFo-HProp [2] shows total loss of 24.4% weight upon heating in the range of 125° C. to 200° C. The loss of weight is correlated to the desorption of the physiosorbed loaded carboxylic acid, as the temperature of weight loss around $T_x$ coincides with the boiling point of the loaded propionic acid (boiling point $T_b$=141).

On one hand the anhydrous character of the sample is evidenced as no other change of weight is observed, especially not in the range of the boiling point of water (100° C.), validating the efficiency of the drying step in the course of the manufacturing process invention. On the other hand, the thermal stability of the carrier carboxylic acid salt MgFo-HProp [2] is clearly validated in a temperature range r.t. and 300° C., as no further loss of weight is observed at accelerated temperatures in the range of 200° C.>T>300° C., The position of the turning point $T_x$ gives evidence for the strength of the physisorption of the inclusion compound of invention, as more energy is required for the evaporation of loaded propionic acid if compared to the evaporation of propionic acid (Ts=141° C.), thus validating the stability of the compound of invention.

Furthermore, the flat shape of the weight-loss curve around the $T_x$ in the range from 125° C. to 200° C. indicates a gentle release of the loaded carboxylic acid compound, indicating the desired control of the acid-release. Such a controlled release is beneficially preventing an undesired "burst release" of the loaded carboxylic acid. The loss of weight, when attributed to the desorption of the loaded acid only, can be beneficially exploited for quantitative information about the loading capacity of compound of invention.

The FIG. 4(B) shows the DTA-signal obtained of the differential thermal analysis (DTA) of the dried sample MgFo-HProp [2] showing the caloric phenomena as a function of increasing temperature (whilst being exposed to a constant heating rate). A single significant caloric change of the sample MgFo-HProp [2] is detected between 125° C. and 200° C. In agreement with the temperature range of the major loss of weight recorded by the TGA signal, the DTA signal shows an endothermic reaction within this temperature range, indicating the desorption of the physiosorbed loaded carboxylic acid from the carboxylic carrier inclusion. The position of the absolute minimum $T_x$ gives evidence for the strength of the physisorption of the inclusion compound of invention, as more energy is required for the evaporation of loaded propionic acid if compared to the evaporation of propionic acid (Ts=141° C.), thus validating the stability of the compound of invention.

The coincidence of TGA and DTA curves in FIG. 4 demonstrates semi-quantitatively the release of propionic acid and the purity of the product of invention, and the thermal stability of the carrier carboxylic acid salt MgFo-HProp [2] up to 300° C.

Example 9—Thermal Analysis Prior Drying

This example demonstrates the thermal analysis, comprising thermogravimetry (TGA) and differential thermal analysis (DTA) for CaAc—HAc [2] prior the drying step according to the process of invention, giving information about the water content prior drying, the efficiency of thermal purification upon drying, the release of the loaded acid and the stability of the carrier structure.

Thermal analysis was carried out according to example 8.

The FIG. 5(A) shows the graph of the thermogravimetric analysis (TGA) of the partially hydrated sample CaAc—HAc [2] prior drying in the course of the process of invention and represents the loss of weight as a function of increasing temperature whilst being exposed to a constant heating rate. The result graph shows two distinct steps of weight-loss. The first significant loss of weight (−7.0 wt % of total weight) takes place between 25-135° C. and in the second stage of weight-loss (11.7 wt % of the total weight) can be observed in a range from 135-300° C. The overall loss of weight of the partially hydrated sample CaAc—HAc [2] upon a constant heating rate between r.t. and 300° C. is 18.74%.

Two distinct second-order phase transitions indicate the expected physical phenomena of evaporation of the side product water upon drying and the desorption of the loaded carboxylic acid. The evaporation of water is indicated by the first turning point $T_1$ of the TGA curve, as it coincides with boiling point of water (100° C.), whereas the desorption of the loaded carboxylic acid is related to the second turning point of the TGA curve $T_x$, as $T_x$ can be related to the boiling point of the loaded acetic acid (118° C.).

The evaporation of water takes place around $T_1$ and is complete at a significantly lower temperature compared to the temperature range, where the evaporation of the loaded acetic acid takes place (around $T_x$). Hence, these exemplary results of the representative sample of the compound of invention, CaAc—HAc [2], for the TGA analysis demonstrate the successful drying of the compound of invention.

Even if the TGA analysis does not provide absolute qualitative information, information about the released material is possible when referred to the caloric information of the DTA curves as shown in FIG. 5(B).

The FIG. 5(B) shows the graph of the differential thermal analysis (DTA) of the partially hydrated sample CaAc—HAc [2] prior drying in the course of the process of invention and demonstrates the caloric phenomena as a function of increasing temperature whilst exposed to a constant heating rate. The DTA signals show two distinct endothermic physicochemical phenomena by two minima of the DTA signal, validating the drying of the sample from water ($T_1$) and the desorption of the physiosorbed loaded carboxylic acid from the carboxylic carrier inclusion ($T_x$).

However, the position of the absolute minimum $T_x$ gives evidence for the strength of the physisorption of the inclusion compound of invention, as more energy is required for the evaporation of loaded acetic acid if compared to the evaporation of acetic acid (boiling point $T_b$=118° C.), thus validating the stability of the compound of invention. The comparably increased thermal energy required to release the loaded carboxylic acid from the carrier structure indicates an overlay of the energy required for evaporation, which is generally required for the isolated carboxylic acid, and the energy required to overcome the attractive forces of physisorption from the loaded carboxylic acid on the inclusion compound according to the invention.

As no further changes of TGA and DTA signal are observed, the purity of the compound of invention with respect to low molecular weight impurities is verified. Furthermore, the thermal stability of the carrier carboxylic acid salt sample CaAc—HAc [2] in a temperature range between r.t. and 300° C. is validated.

The drying according to the process of invention facilitates beneficially thermal purification of the carboxylic acid loaded carboxylic acid salt carrier from the main side product water, as the boiling point of and the loaded acids(s) differs from the boiling point of the side product.

Example 10—Particle Size and Particle Size Distributions

This example demonstrates the powder quality, e.g. flowability and non-aerosol properties, of representative compounds of the invention as evidenced via diffraction granulometry.

The powder particle size and size distributions were determined by a Cilas 920 laser diffraction granulometer manufactured from Quantachrome (wavelength of the incident laser beam: 830 nm), which measures particle size distributions in the 0.2 to 500 µm size range of wet dispersions or dry powders. All optical components are permanently mounted on a cast iron base plate, which means the analyzer is always in alignment, sample recirculation was achieved by two peristaltic pumps. The data analysis of the acquired diffraction pattern was performed based on the Fraunhofer Mie diffraction theories.

The results of the representative samples are given by the distribution curves in FIG. 3, showing the cumulative volume (cum. volume) plotted vs. the particle diameter. The distribution curve of the sample magnesium glutamate with loaded lactic acid MgGlu-HLac [2] is shown in FIG. 4(A), whereas the results of calcium acetate with loaded acetic acid CaAc—HAc [2] are shown in FIG. 4(B) and the results of calcium tartrate with loaded acetic acid and propionic acid CaT-HAc—HProp [1,1] are given in FIG. 4(C).

The analysis of the shape of the distribution curves facilitate to evaluate the mean particle diameters ($d_{av}$, $d_{50}$, $d_{90}$ as introduced above). The characteristic mean particle diameters ($d_{av}$, $d_{50}$, $d_{90}$) of the particle size distribution are given in the following table 6.

TABLE 6

The characteristic mean particle diameters ($d_{av}$, $d_{50}$, $d_{90}$) of exemplary compounds of invention, based on the analysis of the particle size distribution curve in FIG. 4.

| compound name | $d_{av}$/µm | $d_{50}$/µm | $d_{90}$/µm |
|---|---|---|---|
| MgGlu-HLac [2] | 99 | 68 | 233 |
| CaAc-HAc [2] | 221 | 208 | 400 |
| CaT-HAc-HProp [1,1] | 220 | 209 | 400 |

The particle size distributions of the samples CaAc—HAc [2] and CaT-HAc—HProp [1,1] show comparable mean particle diameter $d_{av}$ of approximately 220 µm, which is in the preferred particle size range according to the invention, beneficially supporting flowability. Furthermore, the shape of the distribution curves of the samples CaAc—HAc [2] and CaT-HAc—HProp [1,1](see FIG. 4(B) and FIG. 4(C)) are similar, indicating that the process of invention is suitable to be used for a variety of samples with possibly differing granulation properties. The mean particle diameters ($d_{50}$, $d_{90}$) validate the uniform and/or homogeneous character of particle sizes of CaAc—HAc [2] and CaT-HAc—HProp [1,1]. Herein, the size distribution curves of these representative samples demonstrate the suitability of the compound of invention for any powder-processing manufacturing processes, e.g. for precise weight bottling, gravity feeding, and smooth and precise powder dosing for commercial scale.

In contrast, the sample MgGlu-HLac [2] shown in FIG. 4(A) comprises smaller particles with an average particle size $d_{av}$ of approximately 99 µm (see Table 6). The broader distribution of the MgGlu-HLac [2] sample is visible by the flattened shape of the distribution curve of FIG. 4(A) and the difference in the mean particle diameters $d_a$y and doo. Even if the unity of the particle size-distribution and the particulate size for sample MgGlu-HLac [2] is smaller than obtained for the samples CaAc—HAc [2] and CaT-HAc—HProp [1,1], beneficially no aerosol features are indicated. By the preferred size-ranges true for the compound of invention, no inhalation through the lungs or any harmful respiration of the particles is expected. Therefore, the contact with living creatures during processing and handling does not necessarily need to be strictly avoided, which is advantageously for a save handling purpose.

Example 11—Use as a Preservative in Bakery Goods

This example demonstrates the applicability the compound of invention for the use as a preservative in bakery goods.

A variety of compounds of invention were applied as preservative for bakery goods as test objects, French style bread (FSB) and Mexican style tortilla (MST). The compounds used in this test were selected as they are approved as GRAS food additives with regards to the FDA and EFSA (Food Additives Database and Substances Added to Food Database, 2021), and therefore applicable for bakery goods application.

The preparation of the French style bread was performed according to the ingredients of table 7. The baking process was conducted using the Princess Bread Machine 152006 (Setting: P1; 1.5 lb loaf size; medium color) with a total baking time of 2:53 hours. Subsequently, the bread was cooled down to 21° C. and cut into 20 mm thick slices.

All ingredients were mixed to a dough and flat tortilla shaped samples were formed. All samples were baked for a total of 3 minutes each side on a stove-top pan at approximately 300° C. Subsequently, the tortilla samples were cooled down to 21° C.

TABLE 7

Recipes of French style bread (FSB) and Mexican Style Tortilla (MST).

| ingredients | FSB/g | MST/g |
|---|---|---|
| flour | 350 | 320 |
| water | 190 | 6 |
| canola oil | 15 | 2 |
| sugar | 15 | 63.8 |
| salt | 5 | 237 |
| dry yeast | 7 | 320 |

The samples were exposed to the compounds of invention according to the dosing respective the flour weight as shown in table 7, except for the blanks without exposition of to the compound of invention. Then, single samples were each airtight sealed in a polyethylene zip-lock bag and kept under comparable conditions (r.t., in the dark) for 30 days. It is recognized that defining the shelf life of a food is a difficult task and is an area of intense research for food product development scientists, including food technologists, microbiologists, packaging experts like Gabric et al., therefore preservation efficacy was established by visual and olfactory detection of initial mold infestation. The results of the preservative test are summarized in the table 8.

TABLE 8

Results of the preservation capability of additives in bakery goods.

| | | | preservation/days | | | | |
|---|---|---|---|---|---|---|---|
| additive | dosing | object | <7 | 7-14 | 15-21 | 22-30 | >30 |
| none (blank) | — | MST | | | x | | |
| CaAc-HProp [2] | 0.3% | MST | | | | | x |
| none (blank) | — | FSB | x | | | | |
| CaAc-HProp [2] | 0.2% | FSB | | x | | | |
| CaAc-HAc [2] | 0.3% | FSB | | | | | x |
| CaT-HAc [3] | 0.3% | FSB | | | | | x |

The chemical kinetic principles of the compound of the invention allows for a significant increase preservation of at least 7 days for all samples without a loss of the food quality. An increase from 0.2 wt of the compound of invention is effective to increase the preservation time up to 30 days. An increased shelf life upon exposure to even small doses of the compound of invention opens pathway for new food packaging. Therein, the preservation capabilities of the inventive compound outperform conventional preservatives in comparative industries due to their low cost and health benefits. Especially for products for immediate consumption like for fresh bakery goods, where packaging requirements are often minimal, the compound according to the invention effectively prevents food quality loss.

Example 12—Use for Volume Enhancing and Dough Conditioning in Bakery Goods

The following tests demonstrate the bread improving and dough conditioning effects of a several exemplary compounds according to the invention. French style bread (FSB) was used as a test object.

All additives were dosed that way, that each sample contained 200 ppm of ascorbate, which is typically used as the active ingredient in industry standard bread improvers. One sample was not exposed to any additive (blank), one reference was exposed to ascorbic acid (200 ppm) and another reference was exposed to calcium ascorbate (220 ppm), and two samples were exposed to compounds according to the invention, comprising calcium ascorbate with loaded acetic acid (CaAsc-HAc [2], 280 ppm) and calcium ascorbate with loaded acetic acid (CaAsc-HProp [2], 300 ppm).

The volume improving effect was established by volumetric measurements. The results of the conducted tests can be found in the FIG. 7(A), showing that the additives lead to volume expansion of the bread with respect to the blank sample. The volume enhancing effect of the compounds of invention are outperform the industry standard bread improver additive at equal dosing of the active ingredient ascorbic acid and/or ascorbate, evidencing the suitability of the inventions compound as volume enhancing additive for doughs of bakery goods. FIG. 7(B) presents the cross section of different samples, beneficially showing even volume expansion according to the optical requirements in the baking industry.

Example 13—Use for Color Retention in Meat Products

The following tests outlines the color retention function of the compound according to the invention for the exemplary sample calcium ascorbate with loaded acetic acid (CaAsc-HAc [2]). Samples of grass-fed, grass-finished beef chuck steak were used as test objects. All tests were conducted under equal conditions at 20° C. The inventive compound CaAsc-HAc [2] fulfills the requirements of GRAS food additives with regards to the regulations of the FDA and EFSA. The additive was dosed at 0.2 wt % and was applied topically to the sample.

The color retention effectiveness was established by the method of k-means clustering and an ex-post analysis of the mean RGB:R shift. The colors give an indication of the state of myoglobin in the meat, weather it is deoxygenated, oxygenated, methionated or present in the state of carboxy-myoglobin. The FIG. 8 shows a clear change in color for the blank sample (dashed line) compared to the sample treated with CaAsc-HAc [2] (solid line).

The method of k-means clustering and the ex-post analysis of mean RGB:R shift revealed a more quantitative view on the before mentioned color shift. The time-trace of the color change shows a significant difference already after 24 h for the blank sample compared to the sample treated with CaAsc-HAc [2] as shown in FIG. 8(B).

indicating that the blank sample loses its signature red color earlier than the treated sample over the time frame of 72 hours (see FIG. 8(B)). It can be concluded that CaAsc-HAc [2] facilitates an effective color retention of meat products.

Example 14—Use as Preservative in Meat Products

The following test series outlines the preservation functions of calcium ascorbate with loaded acetic acid (CaAsc-HAc [2]) as a representative sample of the inventive compounds. Samples of grass-fed, grass-finished beef chuck steak were used as test objects. All tests were conducted under equal conditions. The inventive compound CaAsc-HAc [2] fulfills the requirements of GRAS food additives with regards to the regulations of the FDA and EFSA. The additive was dosed at 0.2 wt % and was applied topically to the sample. Tests were conducted at 4° C. and 20° C. The preservation effectiveness was established by testing for total bacteria count and yeast/fungi count. The test for total bacteria count (see FIG. 9(A)) indicates that the treated samples at both 4° C. and 20° C. showed less bacterial infestation in comparison to their blank counter trials. The test for yeast count (see FIG. 9(B)) reveals that the treated samples slightly outperform their blank counter trials.

The application of the inventive compound facilitates an effective reduction of the total bacteria count and yeast formation in the first 164 hours after incubation. Therefore, the inventive compound CaAsc-HAc [2] is beneficially applicable as preservative application in meat products.

Example 15—Use as Preservative Application in Silage

Figure 10:
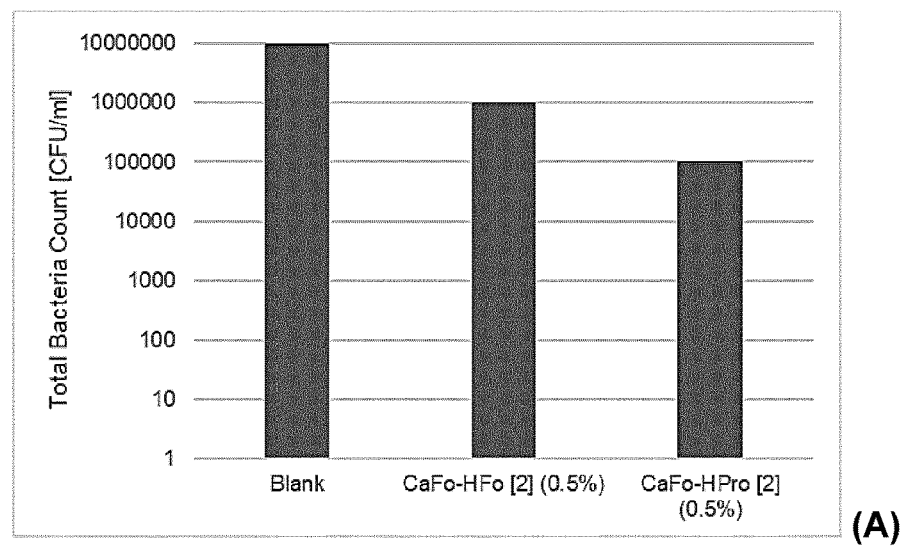
Figure 10:
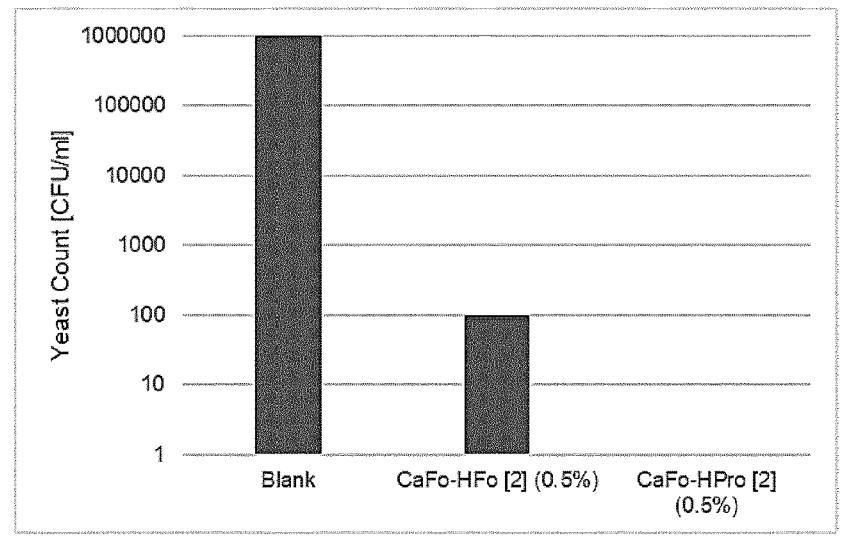
Figure 10:
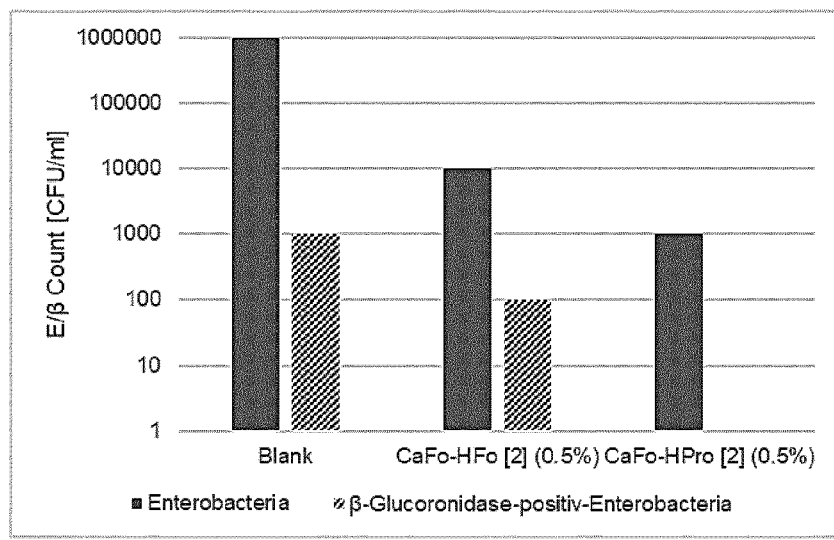

The following test series outlines the silage preservation functions of calcium formate with loaded formic acid (CaFo-HFo [2]), calcium formate with loaded propionic acid (CaFo-HProp [2]) as representative compounds according to the invention. Samples of forage comprising of approximately 90% pasture grass and 10% green rye with a DM-content of 30.75% were used as test objects. All tests were conducted under equal conditions. The inventive compounds CaFo-HProp [2] and CaFo-HFo [2] fulfill the requirements of GRAS food additives based on the regulations of the FDA and EFSA. The additives were dosed at 0.5 wt % and were applied topically to the samples. Tests were conducted under r.t. in a time frame of 31 days. The preservation effectiveness was established by testing for total bacteria count (TBC), yeast/fungi count and Enterobacteria/β-Glucoronidase-positive-Enterobacteria (E/β). The test results indicate that both CaFo-HProp [2] and -CaFo-HFo [2] at 0.5 wt % dosing was able to dramatically reduce TBC (see FIG. 10(A)), yeast count (see FIG. 10(B)) and E/β count (see FIG. 10(C)). Especially CaFo-HProp [2] was able to completely inhibit the growth of yeasts and β-Glucoronidase-positive-Enterobacteria (especially *E. coli*) which are especially undesirable in silage fermentation (FIG. 10).

It can be concluded that the inventive compounds are able to outperform the blank trial in reducing total bacteria count, yeast formation and Enterobacteria formation in the first 744 hours after incubation.

Example 16—Use for Cosmetic Application

This example demonstrates the use of the compound of invention for cosmetic application, here shown by the applicability as additive for a shaving soap.

Liquid shaving soaps were manufactured comprising no additives (blank), with 1 wt % malic acid, 1 wt % calcium citrate, 2 wt % calcium salicylate with loaded lactic acid (CaSal-HLac [2]) and 1% calcium citrate with loaded acetic acid (CaCit-HAc [2]) being added. An overview of the samples is given in Table 9.

TABLE 9

Samples and results of application in shaving soap.

| nr. | additive | % wt | thickening | stability (>24 h) |
|---|---|---|---|---|
| 1 | blank | 0 | − | no |
| 2 | malic acid | 1 | + | no |
| 3 | calcium citrate | 1 | − | yes |

TABLE 9-continued

Samples and results of application in shaving soap.

| nr. | additive | % wt | thickening | stability (>24 h) |
|---|---|---|---|---|
| 4 | CaSal-HLac [2] | 2 | ++ | yes |
| 5 | CaCit-HAc [2] | 1 | +++ | yes |

Each sample of Aleppo-style Arabic soap, consisting of 16% sodium hydroxide, 71.4% olive oil and 12.6% laurel oil, was cut into 22 g sample-sizes and was placed into a bowl to which 22 g of water was added. The mix was stirred with hard soap pieces remaining undissolved and placed for 50 seconds at 600 W in a microwave oven. Afterwards, the respective additives were added in their before mentioned dosing with 44 g of water which resulted in the dissolving of the remaining hard soap pieces. additionally, a change in color and consistency could be observed as the mixture turned into a white and creamy substance. The mixture was placed for 80 seconds in a microwave at 600 W. Thereafter the resulting mixture was hand-blended and filled into a jar for testing and storage. Table 9 outlines the thickening and stability results.

All in all, the mix of the acid-loaded carrier substances with the hard Aleppo-style Arabic soap and water yielded a thick-foamy, yet liquid soap which turned out to be stable. This results in a product suitable as a shaving soap as the flow properties display a gliding effect when shaving, enabling a smoother and closer shave whilst employing acids with the potential to clean out the skin's impurities whilst simultaneously disinfecting razor burns.

The invention claimed is:

1. A solid compound prepared as a powder that exhibits good flowability, the solid compound comprising a following structure,

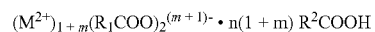

$$(M^{2+})_{1+m}(R_1COO)_2^{(m+1)-} \cdot n(1+m) R^2COOH$$

a carrier carboxylic acid salt $(M^{2+})_{1+m}(R^1COO)_2^{(m+1)-}$ in which $M^{2+}$ is an alkaline earth metal ion or a divalent metal ion selected from the group consisting of iron (Fe), copper (Cu), zinc (Zn), manganese (Mn), tin (Sn), lead (Pb), and nickel (Ni), or a mixture of thereof, $R^1$ is an optionally substituted $C_1$-$C_{10}$-alkyl group, an optionally substituted mono- or polyunsaturated $C_1$-$C_{10}$-alkyl group, or an optionally substituted aryl group, wherein the substituents are selected from the group consisting of carbonyl group (=O), carboxylic acid group (—COOH), amino group (—NH$_2$), hydroxy group (—OH), halogen, cyano group (—CN), and a mixture thereof, and wherein m is 0 to 2, a loaded carboxylic acid R$^2$COOH, wherein R$^2$ is an optionally substituted $C_1$-$C_{10}$-alkyl group or an optionally substituted mono- or polyunsaturated $C_1$-$C_{10}$-alkyl group, wherein the substituents, if present, are selected from the group consisting of carbonyl group (=O), carboxylic acid group (COOH), amino group (—NH$_2$), hydroxy group (—OH), halogen or cyano group (CN) or a mixture thereof, and wherein 2≤n≤10;

wherein a $pK_{a1}$ of a corresponding carboxylic acid of the carrier carboxylic acid $(R^1COO)^{(m+1)-}$ ≤ $pK_{a1}$ of the loaded carboxylic acid(s) $R^2COOH$, wherein the loaded carboxylic acid(s) $R^2COOH$ is physisorbed within a structure of the carrier carboxylic acid salt $(M^{2+})_{1+m}(R^1COO)_2^{(m+1)-}$, wherein a water content of the solid compound is less than 2 equivalents of water relative to the carrier carboxylic acid salt;

wherein $(R^1COO)^{(m+1)-}$ comprises a carrier carboxylic acid selected from the group consisting of formate, acetate, glycolate, propionate, butyrate, succinate, fumarate, maleate, adipate, malate, malonate, tartrate, aspartate, glutamate, benzoate, salicylate, and ascorbate.

2. The solid compound according to claim 1, wherein the structure of the solid compound further comprises o $R^4COOH$ of a second loaded carboxylic acid $R^4COOH$, wherein $R^2$ and $R^4$ are independently selected from the group consisting of an optionally substituted $C_1$-$C_{10}$-alkyl group and an optionally substituted mono- or polyunsaturated $C_1$-$C_{10}$-alkyl group, wherein substituents, if present, are selected from the group consisting of carbonyl group (=O), carboxylic acid group (—COOH), amino group (—NH$_2$), hydroxy group (—OH), halogen, cyano group (—CN), and a mixture thereof, and wherein 0.1<o≤10.

3. The solid compound according to claim 1, wherein $R^2COOH$ is a short-chain carboxylic acid or a mixture of formic, acetic, glycolic, propionic, lactic and/or butyric acid(s), and/or wherein the solid compound further comprises, as a second loaded carboxylic acid $R^4COOH$, a short-chain carboxylic acid or a mixture of formic, acetic, glycolic, propionic, lactic and/or butyric acid(s).

4. The solid compound according to claim 1, wherein $M^{2+}$ is calcium (Ca) or magnesium (Mg).

5. The solid compound according to claim 1, wherein a mean particle diameter of the solid compound is in a range from 10 to 500 μm.

6. The solid compound according to claim 1, wherein the solid compound comprises water by less than 10.0 wt %.

7. The solid compound according to claim 1, wherein $R^1$ of the carrier carboxylic acid $(R^1COO)^{(m+1)-}$ differs from $R^2$ of the loaded carboxylic acid $R^2COOH$.

8. The solid compound according to claim 1, wherein a difference $\Delta pK_{a1}$ between the $pK_{a1}$ of the corresponding carboxylic acid of the carrier carboxylic acid $(R^1COO)^{(m+1)-}$ and the $pK_{a1}$ of the loaded carboxylic acid(s) $R^2COOH$ is 0.1≤$\Delta pK_{a1}$≤5.0.

9. The solid compound according to claim 1, wherein 2<n≤6.

10. The solid compound according to claim 2, wherein $R^2$ of the loaded carboxylic acid $R^2COOH$ differs from $R^4$ of the second loaded carboxylic acid $R^4COOH$.

11. The solid compound according to claim 2, wherein at least one of a molar mass of the loaded carboxylic acid $R^2COOH$ and a molar mass of the second loaded carboxylic acid $R^4COOH$ is greater than a molar mass of the carrier carboxylic acid $(R^1COO)^{(m+1)-}$.

12. The solid compound according to claim 2, wherein a molar mass of the loaded carboxylic acid $R^2COOH$ is lower than a molar mass of each of the carrier carboxylic acid $(R^1COO)^{(m+1)-}$ and the second loaded carboxylic acid $R^4COOH$.

* * * * *